United States Patent [19]
Hershey

[11] Patent Number: 5,548,775
[45] Date of Patent: Aug. 20, 1996

[54] SYSTEM AND METHOD FOR ADAPTIVE ACTIVE MONITORING OF HIGH SPEED DATA STREAMS USING FINITE STATE MACHINES

[75] Inventor: Paul C. Hershey, Manassas, Va.

[73] Assignee: International Business Machines Corporation, Armonk, N.Y.

[21] Appl. No.: 175,854

[22] Filed: Dec. 30, 1993

[51] Int. Cl.[6] .............................. G06F 7/02; G06F 7/64; G06F 11/28; G06F 11/08
[52] U.S. Cl. .................. 395/800; 395/182.02; 360/48; 360/46; 371/22.5; 364/DIG. 1; 364/DIG. 2
[58] Field of Search .................... 395/800, 575, 395/500, 650, 550, 250, 275, 775, 200, 325, 400, 425, 182.02, 108; 364/DIG. 1, DIG. 2, 468, 580, 551.01, 575; 370/85.15, 85.5, 94.1, 17; 377/16, 72; 371/27, 29.1, 37.4, 37.7, 39.1, 21.3, 11.1, 37.1, 40.1, 40.2, 22.5, 27, 38.1; 341/67, 65, 94; 340/827

[56] References Cited

U.S. PATENT DOCUMENTS

| | | | |
|---|---|---|---|
| 3,975,714 | 8/1976 | Weber et al. | 395/800 |
| 4,032,885 | 6/1977 | Roth | 364/715.11 |
| 4,107,650 | 8/1978 | Lube et al. | 371/39.1 |
| 4,227,245 | 10/1980 | Edbland et al. | 364/468 |
| 4,413,339 | 11/1983 | Riggle et al. | 371/40.1 |
| 4,458,309 | 7/1984 | Wilder, Jr. | 395/575 |
| 4,459,656 | 7/1984 | Wilder, Jr. | 395/550 |
| 4,521,849 | 6/1985 | Wilder, Jr. | 395/575 |
| 4,779,194 | 10/1988 | Jennings et al. | 395/650 |
| 4,805,089 | 2/1989 | Lane et al. | 364/188 |
| 4,851,998 | 7/1989 | Hospodor | 364/580 |
| 4,905,171 | 2/1990 | Kiel et al. | 364/551.01 |
| 4,939,724 | 7/1990 | Ebersole | 370/85.15 |
| 4,944,038 | 7/1990 | Hardy et al. | 370/85.5 |
| 4,980,824 | 12/1990 | Tulpule et al. | 395/650 |
| 5,035,302 | 7/1991 | Thangavelu | 187/382 |
| 5,062,055 | 10/1991 | Chinnaswamy et al. | 364/551.01 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,162,795 | 11/1992 | Shirota | 341/67 |

FOREIGN PATENT DOCUMENTS 6-153855  3/1986  Japan.

*Primary Examiner*—Daniel H. Pan
*Attorney, Agent, or Firm*—John E. Hoel; Joseph C. Redmond

[57] ABSTRACT

A high speed, serial pattern detector, uses parallel finite state machines to analyze sequential bits in a serial bit stream. Single bit random access memories store the single bit of the next address to be used in detecting the sequence.

22 Claims, 23 Drawing Sheets

| PS | NEXT STATE VS INPUT | |
|---|---|---|
| | $X_i = 0$ | $X_i = 1$ |
| A | B | A |
| B | B | C |
| C | D | C |
| D | A | D |

| PS | STATE VARIABLE $q_1\ q_0$ |
|---|---|
| A | 0  0 |
| B | 0  1 |
| C | 1  0 |
| D | 1  1 |

| PS AND INPUT VARIABLE | | | NS | |
|---|---|---|---|---|
| $q_1$ | $q_0$ | $X_i$ | $q_1$ | $q_0$ |
| 0 | 0 | 0 | 0 | 1 |
| 0 | 0 | 1 | 0 | 0 |
| 0 | 1 | 0 | 0 | 1 |
| 0 | 1 | 1 | 1 | 0 |
| 1 | 0 | 0 | 1 | 1 |
| 1 | 0 | 1 | 1 | 0 |
| 1 | 1 | 0 | 0 | 0 |
| 1 | 1 | 1 | 1 | 1 |

FIG. 12

| PS AND INPUT VARIABLE | | | | | NS | | | | OUTPUT |
|---|---|---|---|---|---|---|---|---|---|
| $q_3$ | $q_2$ | $q_1$ | $q_0$ | $X_i$ | $q_3$ | $q_2$ | $q_1$ | $q_0$ | $\omega$ |
| 0 | 0 | 0 | 0 | 0 | 0 | 0 | 0 | 1 | 0 |
| 0 | 0 | 0 | 0 | 1 | 0 | 0 | 0 | 0 | 0 |
| 0 | 0 | 0 | 1 | 0 | 0 | 0 | 1 | 0 | 0 |
| 0 | 0 | 0 | 1 | 1 | 0 | 0 | 0 | 0 | 0 |
| 0 | 0 | 1 | 0 | 0 | 0 | 0 | 1 | 1 | 0 |
| 0 | 0 | 1 | 0 | 1 | 0 | 1 | 0 | 0 | 0 |
| 0 | 0 | 1 | 1 | 0 | 0 | 1 | 0 | 1 | 0 |
| 0 | 0 | 1 | 1 | 1 | 0 | 0 | 0 | 0 | 0 |
| 0 | 1 | 0 | 0 | 0 | 0 | 0 | 0 | 0 | 0 |
| 0 | 1 | 0 | 0 | 1 | 0 | 1 | 1 | 0 | 0 |
| 0 | 1 | 0 | 1 | 0 | 0 | 1 | 1 | 1 | 1 |
| 0 | 1 | 0 | 1 | 1 | 0 | 0 | 0 | 0 | 0 |
| 0 | 1 | 1 | 0 | 0 | 1 | 0 | 0 | 0 | 1 |
| 0 | 1 | 1 | 0 | 1 | 0 | 0 | 0 | 0 | 0 |
| 0 | 1 | 1 | 1 | 0 | 0 | 0 | 0 | 0 | 0 |
| 0 | 1 | 1 | 1 | 1 | 0 | 0 | 0 | 0 | 0 |
| 1 | 0 | 0 | 0 | 0 | 0 | 0 | 0 | 0 | 0 |
| 1 | 0 | 0 | 0 | 1 | 0 | 0 | 0 | 0 | 0 |
| 1 | 0 | 0 | 1 | 0 | 0 | 0 | 0 | 0 | 0 |
| 1 | 0 | 0 | 1 | 1 | 0 | 0 | 0 | 0 | 0 |
| 1 | 0 | 1 | 0 | 0 | 0 | 0 | 0 | 0 | 0 |
| 1 | 0 | 1 | 0 | 1 | 0 | 0 | 0 | 0 | 0 |
| 1 | 0 | 1 | 1 | 0 | 0 | 0 | 0 | 0 | 0 |
| 1 | 0 | 1 | 1 | 1 | 0 | 0 | 0 | 0 | 0 |
| 1 | 1 | 0 | 0 | 0 | 0 | 0 | 0 | 0 | 0 |
| 1 | 1 | 0 | 0 | 1 | 0 | 0 | 0 | 0 | 0 |
| 1 | 1 | 0 | 1 | 0 | 0 | 0 | 0 | 0 | 0 |
| 1 | 1 | 0 | 1 | 1 | 0 | 0 | 0 | 0 | 0 |
| 1 | 1 | 1 | 0 | 0 | 0 | 0 | 0 | 0 | 0 |
| 1 | 1 | 1 | 0 | 1 | 0 | 0 | 0 | 0 | 0 |
| 1 | 1 | 1 | 1 | 0 | 0 | 0 | 0 | 0 | 0 |
| 1 | 1 | 1 | 1 | 1 | 0 | 0 | 0 | 0 | 0 |

| FIG. 14A |
|---|
| FIG. 14B |

FIG. 14A

| PS<br>$q_3$ $q_2$ $q_1$ $q_0$ | INPUT VARIABLE<br>$x_{i1}$ $x_{i0}$ | NS<br>$q_3$ $q_2$ $q_1$ $q_0$ | OUTPUT<br>$\omega$ |
|---|---|---|---|
| 0 0 0 0 | 0 0 | 0 0 1 0 | 0 |
| 0 0 0 0 | 0 1 | 0 0 0 0 | 0 |
| 0 0 0 0 | 1 0 | 0 0 0 1 | 0 |
| 0 0 0 0 | 1 1 | 0 0 0 0 | 0 |
| 0 0 0 1 | 0 0 | 0 0 1 1 | 0 |
| 0 0 0 1 | 0 1 | 0 1 0 0 | 0 |
| 0 0 0 1 | 1 0 | 0 0 0 1 | 0 |
| 0 0 0 1 | 1 1 | 0 0 0 0 | 0 |
| 0 0 1 0 | 0 0 | 0 1 0 1 | 0 |
| 0 0 1 0 | 0 1 | 0 0 0 0 | 0 |
| 0 0 1 0 | 1 0 | 0 0 0 0 | 0 |
| 0 0 1 0 | 1 1 | 0 1 1 0 | 0 |
| 0 0 1 1 | 0 0 | 0 1 1 1 | 1 |
| 0 0 1 1 | 0 1 | 0 0 0 0 | 0 |
| 0 0 1 1 | 1 0 | 0 0 0 1 | 0 |
| 0 0 1 1 | 1 1 | 0 0 0 0 | 0 |
| 0 1 0 0 | 0 0 | 0 0 0 1 | 0 |
| 0 1 0 0 | 0 1 | 0 0 0 0 | 0 |
| 0 1 0 0 | 1 0 | 1 0 0 0 | 1 |
| 0 1 0 0 | 1 1 | 0 0 0 0 | 0 |
| 0 1 0 1 | 0 0 | 0 0 0 1 | 1 |
| 0 1 0 1 | 0 1 | 0 0 0 0 | 1 |
| 0 1 0 1 | 1 0 | 0 0 0 1 | 0 |
| 0 1 0 1 | 1 1 | 0 0 0 0 | 0 |
| 0 1 1 0 | 0 0 | 0 0 0 1 | 1 |
| 0 1 1 0 | 0 1 | 0 0 0 0 | 1 |
| 0 1 1 0 | 1 0 | 0 0 0 1 | 0 |
| 0 1 1 0 | 1 1 | 0 0 0 0 | 0 |
| 0 1 1 1 | 0 0 | 0 0 1 0 | 0 |
| 0 1 1 1 | 0 1 | 0 0 0 0 | 0 |
| 0 1 1 1 | 1 0 | 0 0 0 1 | 0 |
| 0 1 1 1 | 1 1 | 0 0 0 0 | 0 |

| 1 | 0 | 0 | 0 | 0 | 0 | 0 | 0 | 1 | 0 | 0 |
|---|---|---|---|---|---|---|---|---|---|---|
| 1 | 0 | 0 | 0 | 0 | 1 | 0 | 0 | 0 | 0 | 0 |
| 1 | 0 | 0 | 0 | 1 | 0 | 0 | 0 | 0 | 1 | 0 |
| 1 | 0 | 0 | 0 | 1 | 1 | 0 | 0 | 0 | 0 | 0 |
| 1 | 0 | 0 | 1 | 0 | 0 | 0 | 0 | 0 | 0 | 0 |
| 1 | 0 | 0 | 1 | 0 | 1 | 0 | 0 | 0 | 0 | 0 |
| 1 | 0 | 0 | 1 | 1 | 0 | 0 | 0 | 0 | 0 | 0 |
| 1 | 0 | 0 | 1 | 1 | 1 | 0 | 0 | 0 | 0 | 0 |
| 1 | 0 | 1 | 0 | 0 | 0 | 0 | 0 | 0 | 0 | 0 |
| 1 | 0 | 1 | 0 | 0 | 1 | 0 | 0 | 0 | 0 | 0 |
| 1 | 0 | 1 | 0 | 1 | 0 | 0 | 0 | 0 | 0 | 0 |
| 1 | 0 | 1 | 0 | 1 | 1 | 0 | 0 | 0 | 0 | 0 |
| 1 | 0 | 1 | 1 | 0 | 0 | 0 | 0 | 0 | 0 | 0 |
| 1 | 0 | 1 | 1 | 0 | 1 | 0 | 0 | 0 | 0 | 0 |
| 1 | 0 | 1 | 1 | 1 | 0 | 0 | 0 | 0 | 0 | 0 |
| 1 | 0 | 1 | 1 | 1 | 1 | 0 | 0 | 0 | 0 | 0 |
| 1 | 1 | 0 | 0 | 0 | 0 | 0 | 0 | 0 | 0 | 0 |
| 1 | 1 | 0 | 0 | 0 | 1 | 0 | 0 | 0 | 0 | 0 |
| 1 | 1 | 0 | 0 | 1 | 0 | 0 | 0 | 0 | 0 | 0 |
| 1 | 1 | 0 | 0 | 1 | 1 | 0 | 0 | 0 | 0 | 0 |
| 1 | 1 | 0 | 1 | 0 | 0 | 0 | 0 | 0 | 0 | 0 |
| 1 | 1 | 0 | 1 | 0 | 1 | 0 | 0 | 0 | 0 | 0 |
| 1 | 1 | 0 | 1 | 1 | 0 | 0 | 0 | 0 | 0 | 0 |
| 1 | 1 | 0 | 1 | 1 | 1 | 0 | 0 | 0 | 0 | 0 |
| 1 | 1 | 1 | 0 | 0 | 0 | 0 | 0 | 0 | 0 | 0 |
| 1 | 1 | 1 | 0 | 0 | 1 | 0 | 0 | 0 | 0 | 0 |
| 1 | 1 | 1 | 0 | 1 | 0 | 0 | 0 | 0 | 0 | 0 |
| 1 | 1 | 1 | 0 | 1 | 1 | 0 | 0 | 0 | 0 | 0 |
| 1 | 1 | 1 | 1 | 0 | 0 | 0 | 0 | 0 | 0 | 0 |
| 1 | 1 | 1 | 1 | 0 | 1 | 0 | 0 | 0 | 0 | 0 |
| 1 | 1 | 1 | 1 | 1 | 0 | 0 | 0 | 0 | 0 | 0 |
| 1 | 1 | 1 | 1 | 1 | 1 | 0 | 0 | 0 | 0 | 0 |

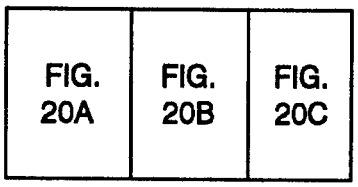
FIG. 20
FIG. 20A
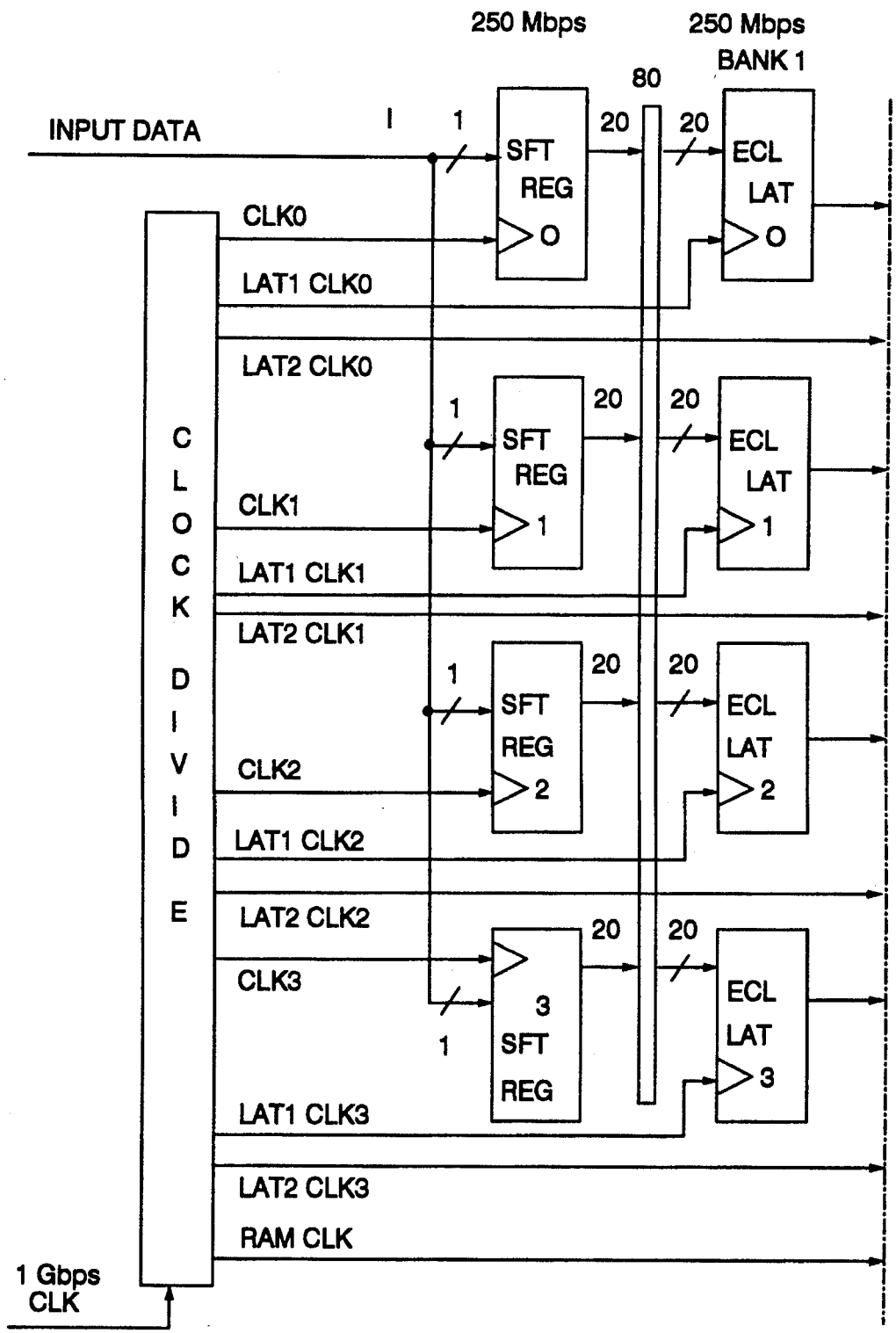

ARRAY OF COUNTERS

SYSTEM AND METHOD FOR ADAPTIVE ACTIVE MONITORING OF HIGH SPEED DATA STREAMS USING FINITE STATE MACHINES

BACKGROUND OF THE INVENTION

1. Technical Field

The invention disclosed broadly relates to data processing systems and more particularly relates to a system and method for high speed, pattern detection of serial data streams, using finite state machines.

2. Related Patent Applications

This patent application is related to the co-pending U.S. patent application Ser. No. 08/024,572, filed Mar. 1, 1993, now U.S. Pat. No. 5,375,070 entitled "Information Collection Architecture and Method for a Data Communications Network," by J. G. Waclawsky, Paul C. Hershey, Kenneth J. Barker and Charles S. Lingafelt, Sr., assigned to the IBM Corporation and incorporated herein by reference.

This patent application is also related to the co-pending U.S. patent application, Ser. No. 08/024,563, filed Mar. 1, 1993, now abandoned entitled "Event Driven Interface for a System for Monitoring and Controlling a Data Communications Network," by Paul C. Hershey, John G. Waclawsky, Kenneth J. Barker and Charles S. Lingafelt, Sr., assigned to the IBM Corporation and incorporated herein by reference.

This patent application is also related to the co-pending U.S. patent application, Ser. No. 08/024,542, filed Mar. 1, 1993, entitled "System and Method for Configuring an Event Driven Interface and Analyzing Its Output for Monitoring and Controlling a Data Communications Network," by John G. Waclawsky and Paul C. Hershey, assigned to the IBM Corporation and incorporated herein by reference.

This patent application is also related to the co-pending U.S. patent application, Ser. No. 08/138,045, filed Oct. 15, 1993, entitled "System and Method for Adaptive, Active Monitoring of a Serial Data Stream having a Characteristic Pattern," by Paul C. Hershey and John G. Waclawsky, assigned to the IBM Corporation and incorporated herein by reference.

3. Background Art

Finite state machines (FSM) are commonly used in the implementation of telecommunications protocols and of input/output processors, because finite state machines can define all possible conditions completely and unambiguously. However, a problem with finite state machines is defining the sequence of states and the accompanying actions to be accomplished with each state. Conventional implementations of finite state machines result in program code sets which are extensive and complex. This problem has been solved by the "System and Method for Adaptive, Active Monitoring of a Serial Data Stream having a Characteristic Pattern," by Paul C. Hershey, et al., cited above. The adaptive, active monitor comprises finite state machines (FSM) which are constructed to detect the occurrence of a characteristic data pattern in a bit stream. If the FSM successfully detects the pattern, it then outputs a pattern alarm signal, indicating the successful detection of the characteristic data pattern.

One feature of the adaptive, active monitor invention is the programmability of the finite state machines (FSMs) and the programmability of their interconnection. Each FSM consists of an address register and a memory. The address register has two portions, an n-1 bit wide first portion and a X-bit wide second portion X. X is one bit for binary data, X is a word of two bits for Manchester encoded data, or X is a word of five bits for FDDI encoded data. The X-bit wide portion is connected to the input data stream which contains the characteristic data pattern of interest. The n-X bit wide portion contains data which is output from the memory. The next address to be applied by the address register to the memory is made up of the X-1 bit wide portion and the next arriving X-bit word from the input data stream.

Each memory has a plurality of data storage locations, each having a first portion with n-X bits, to be output to the address register as part of the next address. Many of the memory locations have a second portion which stores a command to reset the address register if the FSM fails to detect its designated component bit pattern.

A terminal location in the memory of an FSM will include a start signal value to signal another FSM to start analyzing the data stream. If the terminal location in a predecessor FSM memory is successful in matching the last bit of its designated component bit pattern, then it will output a starting signal to a succeeding FSM. The succeeding FSM will begin analyzing the data stream for the next component bit pattern of the characteristic data pattern. The memory of an FSM can be a writable RAM, enabling its reconfiguration to detect different component bit patterns.

A remaining problem in the detection of characteristic data patterns in serial data streams is the need to perform complex pattern detection at the ultra high speeds of communications media operating at gigahertz clock frequencies. At these high frequencies, conventional high speed logic, such as emitter coupled logic (ECL,) is not sufficiently fast.

OBJECTS OF THE INVENTION

It is therefore an object of the invention to increase the speed of detection of a characteristic data pattern to obtain effective, realtime control for high speed data networks.

It is another object of the invention to provide high speed, programmable finite state machines to detect a variety of characteristic data patterns.

It is another object of the invention to detect characteristic data patterns in a high speed communications medium.

SUMMARY OF THE INVENTION

A system and method are disclosed for adaptive, active monitoring of a serial stream of data having a characteristic pattern. The system includes a shift register, having an input coupled to the serial bit stream and at least two sequential bit stages, a first stage for buffering a first occurring binary bit and a second stage for buffering a sequentially second occurring binary bit.

A first n-bit address register is included, having a first portion with n-1 bits and a second portion with one bit and an input to the second portion coupled to the first stage of the shift register, for receiving a bit from the serial bit stream.

A first addressable memory is included, having a plurality of data storage locations, the first memory having an n-bit address input coupled an output of the first address register, the first memory configured with data stored in first and second ones of the data storage locations to represent at least a first portion of a digital filter for the characteristic pattern.

A logic means is included, having an input coupled to an output of the first memory, for converting the data output from the first data storage location into feedback data output on a feedback path to the first register, for transferring the feedback data to the first portion of the first address register, for concatenation with the bit from the first stage to form an address for the second one of the data storage locations of the first memory.

A second n-bit address register is included, having a first portion with n-1 bits and a second portion with one bit and an input to the second portion thereof coupled to the second stage of the shift register, for receiving a bit from the serial bit stream.

A second addressable memory is included, having a plurality of data storage locations, the second memory having an n-bit address input coupled an output of the second address register, the second memory configured with data stored in first and second ones of the data storage locations therein, to represent at least a second portion of a digital filter for the characteristic pattern.

The logic means has an input coupled to an output of the second memory, for converting the data output from the first data storage location therein, into the feedback data output on the feedback path to the second register, for transferring the feedback data to the first portion of the second address register, for concatenation with the bit from the second stage to form an address for the second one of the data storage locations of the second memory.

An output signal generator is coupled to the feedback path, for outputting a pattern detection alarm in response to the digital filter detecting the characteristic pattern. In this manner, an ultra high speed bit stream can be analyzed by the invention to identify characteristic patterns.

The invention can be formed in an integrated circuit chip. Alternately, the invention can be formed in a multi-tasking memory partition of a data processor.

Applications for the invention include detecting a characteristic pattern in a bit pattern in a data communications medium or a bit pattern in a data communications protocol.

In another application, the invention is the pattern detection component of an information collection architecture coupled to the network. The pattern detection invention outputs an event vector, which is a control signal to the network to alter communication characteristics thereof. The resulting information collection architecture system provides a flexible, rapidly reconfigurable means to monitor and control data communications networks, through realtime monitoring of the data patterns in their traffic.

DESCRIPTION OF THE FIGURES

These and other objects, features and advantages will be more fully appreciated with reference to the accompanying figures.

FIG. 12 shows the system design truth table for RAM implementation of 9 state machine, in accordance with the invention.

FIG. 14, 14A and 14B shows the system design truth table for RAM implementation of 9 state machine with 2-bit input variable, in accordance with the invention.

FIG. 20, 20A, 20B and 20C shows the SSA implementation for the FSMST1 TKED detect with 50 Mbps off-the-shelf RAMs, in accordance with the invention.

DISCUSSION OF THE PREFERRED EMBODIMENT

A high speed, serial pattern detector, uses parallel finite state machines to analyze sequential bits in a serial bit stream. Single bit random access memories store the single bit of the next address to be used in detecting the sequence.

Figure 1:
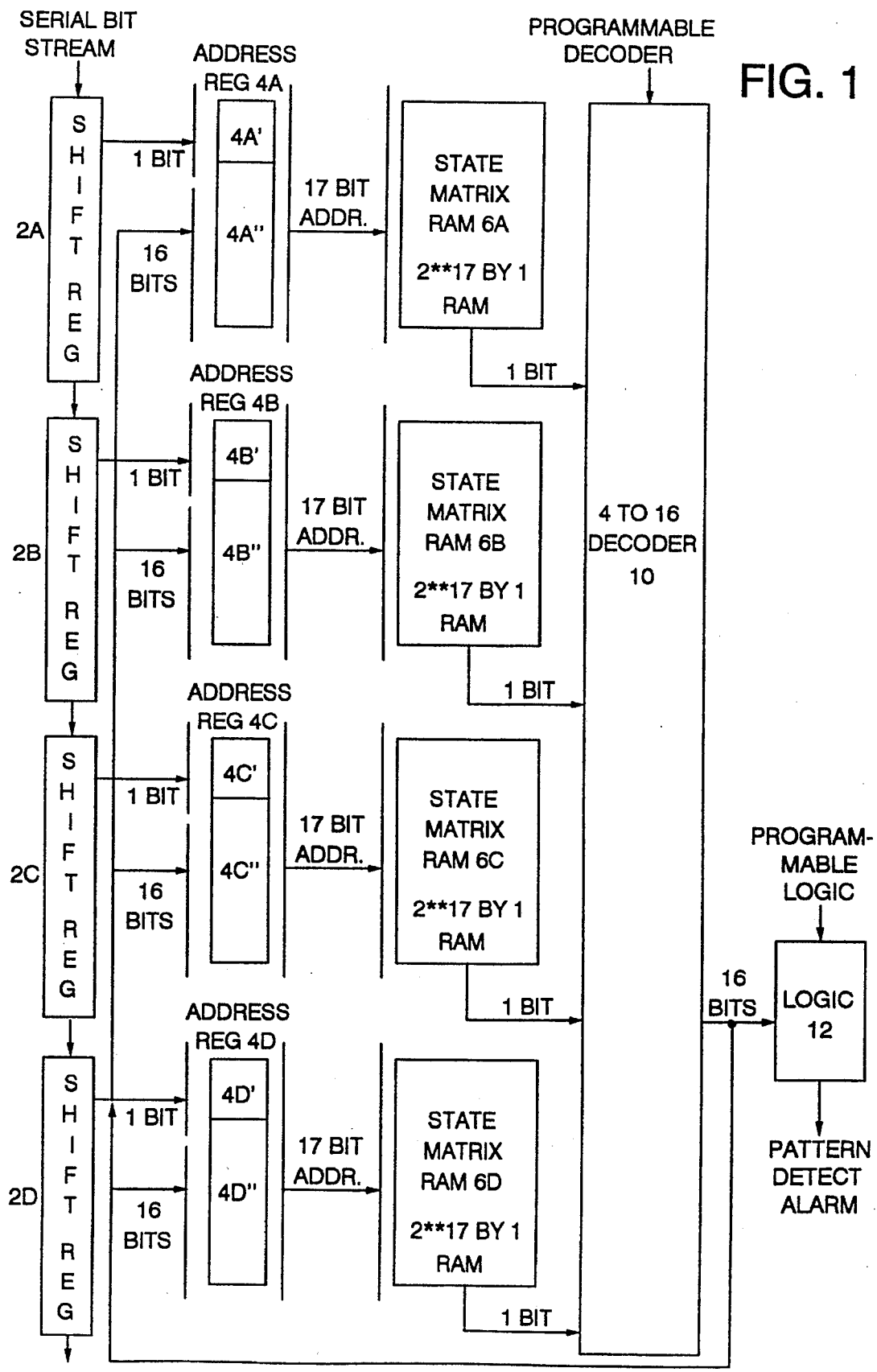
FIG. 1 is a functional block diagram of a first embodiment of the high speed finite state machine pattern detector, in accordance with the invention.

In FIG. 1, a serial bit stream is taken from a communications network, such as a token ring network. The shift register 2A, 2B, 2C, 2D is a four bit shift register which takes four consecutive bits from the serial bit stream and applies each respective bit of the four, to a respective address register 4A, 4B, 4C or 4D. The one bit input 4A' to the address register 4A is augmented by a 16 bit portion 4A" derived from the output of the decoder 10. The resultant 17 bit address is applied to the address input of the RAM 6A. A similar description can be made for the address register 4B and its RAM 6B, the address register 4C and its RAM 6C, and the address register 4D and its RAM 6D.

The RAM 6A, for example, is a 2**17 times one bit RAM. Each bit in the RAM 6A is a single bit of the next address to be applied to the address registers 4A, 4B, 4C and 4D. The manner of applying these addresses makes use of the 4-to-16 programmable decoder 10. The one bit output from each of the four RAMs 6A, 6B, 6C and 6D, makes up a four bit input to the decoder 10, resulting in a 16 bit output which is part of the next address applied to the address registers 4A, 4B, 4C and 4D. Thus, each consecutive stage of accessing the RAMs will be done with a 17 bit address derived from the decoder 10 and the next four bits taken from the serial bit stream by the shift register 2.

Pattern recognition occurs when a predetermined expression of 16 bits is detected by the programmable logic 12, which outputs a pattern detection alarm. That expression corresponds to one of the next 16 bit address combinations.

One new feature of the invention is the parallel monitoring of a sequence of bits in the serial bit stream. In the case of FIG. 1A, each consecutive four bits is monitored in parallel. This results in at least a four times improvement in the performance of pattern recognition for predetermined patterns in the serial bit stream.

Figure 2:
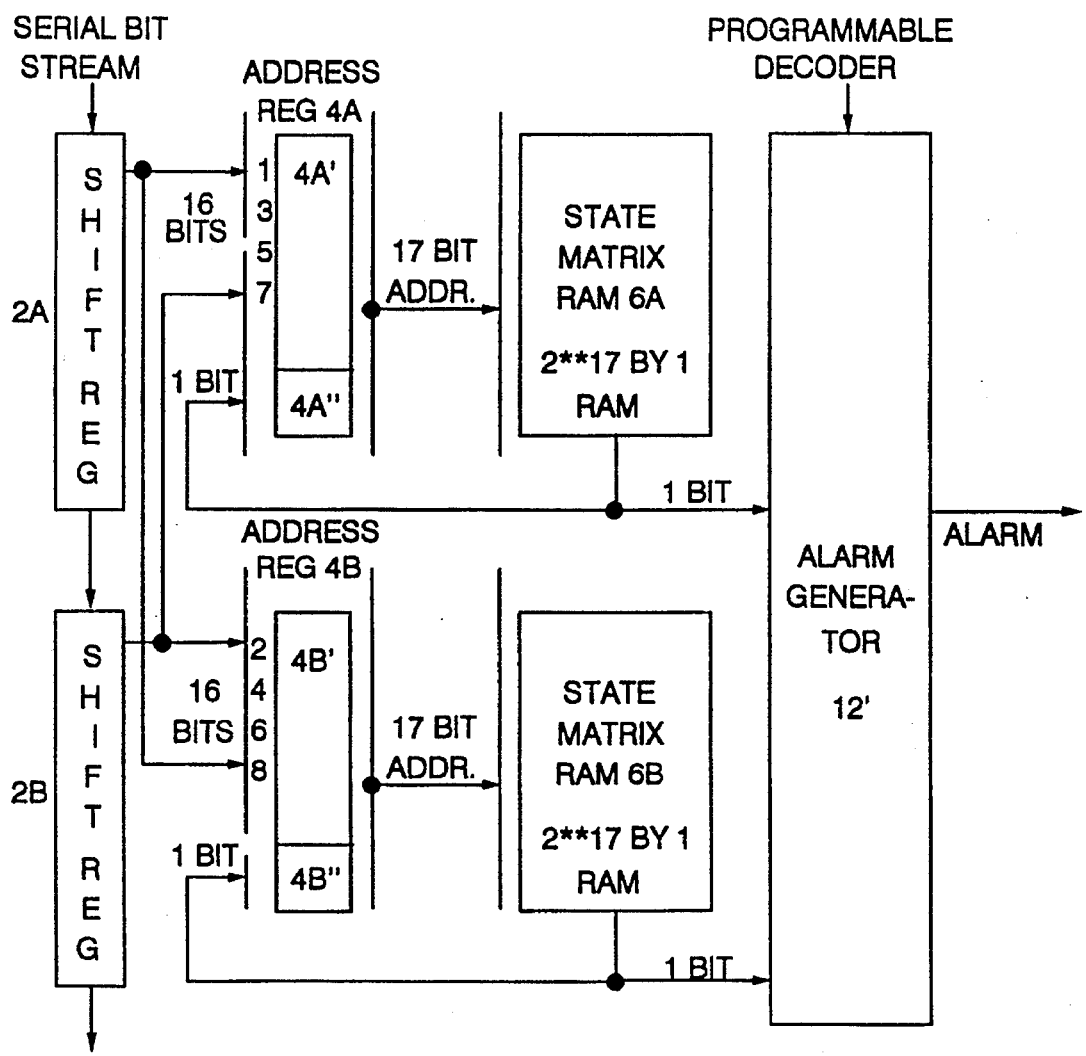
FIG. 2 is a functional block diagram of a second embodiment of the high speed finite state machine pattern detector, in accordance with the invention.

FIG. 2 is a functional block diagram of a second embodiment of the high speed finite state machine pattern detector, in accordance with the invention. In this embodiment, the consecutive bits from the serial bit stream are alternately buffered in the first and second address registers, respectively, to accumulate 16 bits, for example, in portion 4A'. A single bit is fed back from the RAM 6A to the portion 4A" of the address register. One predetermined combination of bits output from the RAMs 6A and 6B, will generate an alarm signal by the alarm generator 12'.

Figure 3:
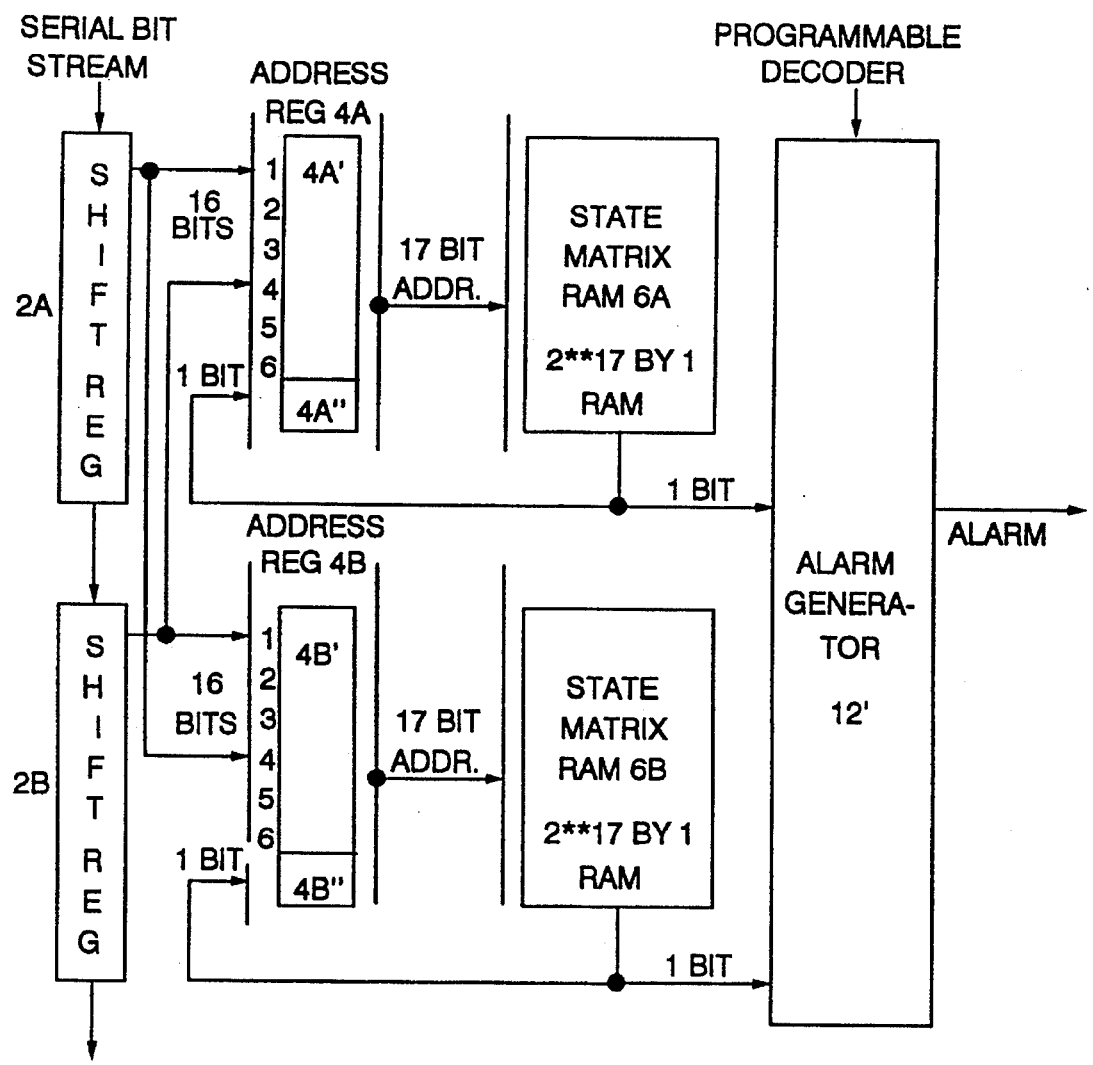
FIG. 3 is a functional block diagram of a third embodiment of the high speed finite state machine pattern detector, in accordance with the invention.

FIG. 3 is a functional block diagram of a third embodiment of the high speed finite state machine pattern detector, in accordance with the invention. This embodiment modifies that shown in FIG. 1B, by applying all of the bits from the serial bit stream to both address registers 4A and 4B.

Figure 4:
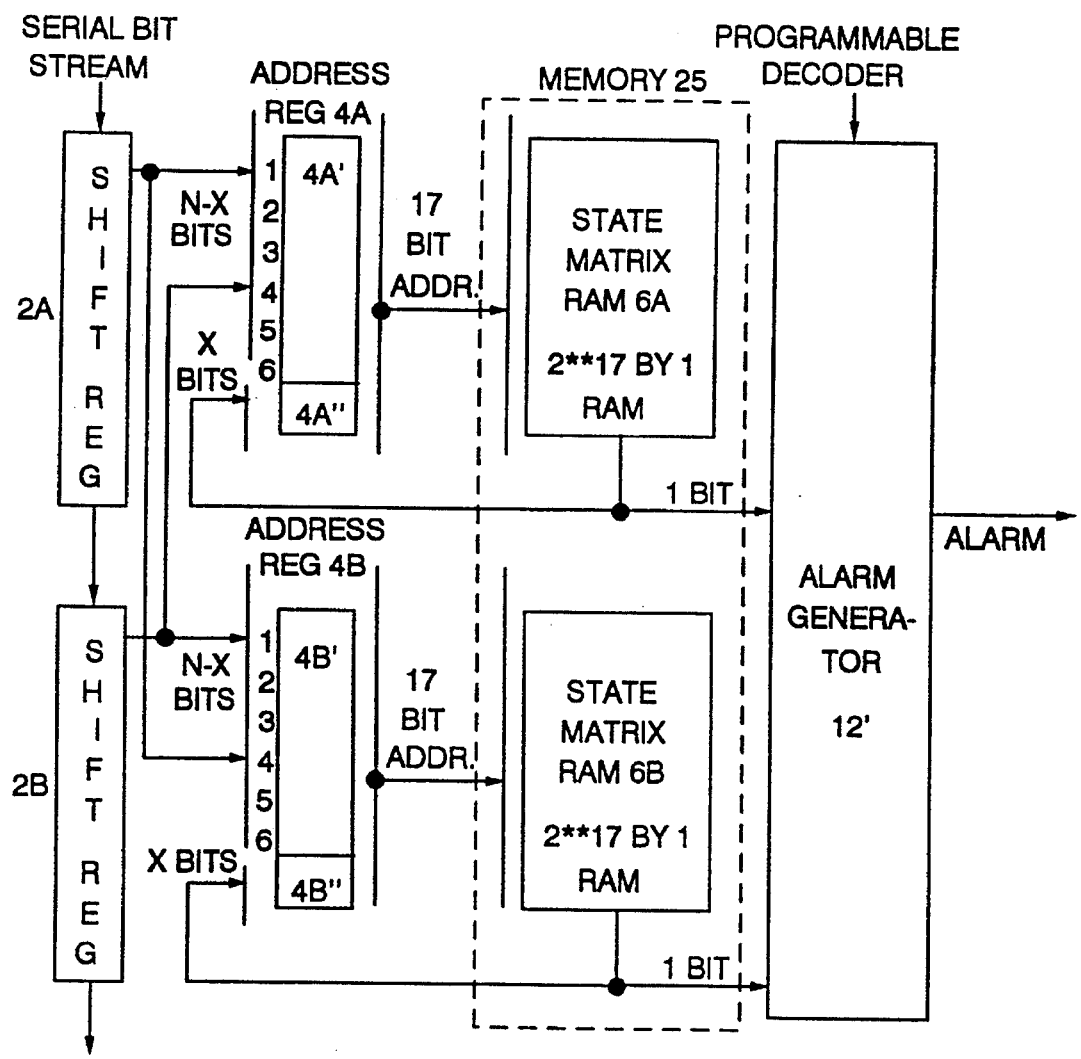
FIG. 4 is a functional block diagram of a fourth embodiment of the high speed finite state machine pattern detector, in accordance with the invention.

FIG. 4 is a functional block diagram of a fourth embodiment of the high speed finite state machine pattern detector, in accordance with the invention. This embodiment modifies that shown in FIG. 3, by providing n-x bits to portion 4A' and x bits to portion 4A" of the address register 4A, where n is the total number of address bits and x is a variable integer from 1 to n-1. In addition, the RAMs 6A and 6B can be embodied in the same memory 25, occupying separate memory partitions.

DETAILED DESCRIPTION OF THE INVENTION

The following is a more detailed description of the invention. We now present an encoding procedure for the secondary state assignment (SSA) based on a table lookup implementation for the recognizer FSMs. For this implementation the set of values of the FSM state variables are assigned so that each state variable can be stored as a code word in a Read Only Memory (ROM), Random Access Memory (RAM), or Programmable Read Only Memory (PROM). We refer to this implementation of the lookup table as the RAM lookup table. Each row of the RAM lookup table corresponds to an SSA code word. We make the following assumptions with respect to this SSA code.

Assumption 4.5 The SSA code is a binary code.

Assumption 4.6 The input variable values are encoded with a vector of binary values.

These assumptions are required for TTL and CMOS (Complementary Metal-Oxide-Semiconductor) ROM, RAM, or PROM implementations that can distinguish only two logic levels, (e.g., high or low).

Definition 4.37 Let NST denote the number of states in an FSM. Let NCWB denote the number of binary state variables needed to uniquely encode each of the states. Let $(q_{NCWB-1}, q_{NCWB-2}, \ldots, q_0)$ denote the binary state variables where $q_i \in \{0,1\}$ and $i=0, \ldots$, NCWB. Then, $$NCWB = \lceil \log_2 NST \rceil \qquad (4.13)$$

Assumption 4.7 In a ROM, RAM, or PROM implementation, each state is assigned a value that corresponds to a distinct code word that can be stored in a memory location in the ROM, RAM, or PROM, respectively.

Figure 5:
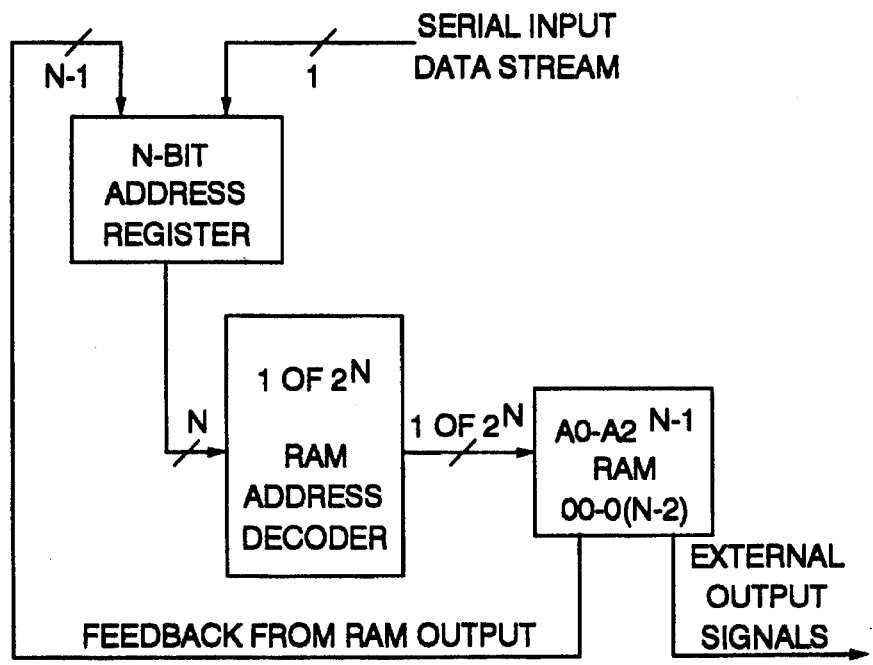
FIG. 5 shows the RAM lookup table implementation block diagram, in accordance with the invention.

FIG. 5 provides an implementation architecture for a recognizer FSM that was introduced by Barker and Lingafelt [16] and later enhanced by Hershey, et al., [60]. This implementation is based on a RAM look up table design that is composed of an N-bit wide address register, a 1 of $2^N$ address decoder, and a RAM with $2^N$ memory locations and at least N—1 output lines. N—1 bit code words are stored in the RAM. Each code word is composed of an N—1-tuple vector of state variable values that encode the FSM states. During every bit-time a code word is output from the RAM and fed to the N—1 most significant bits of the N-bit wide address register. This code word represents the encoded value of the next state (NS). The least significant bit of this address register is the input variable from the channel. At the next clocked bit-time, the input variable bit is clocked into the address register along with the RAM code word. The content of the address register is now the encoded value of the present state and the present input variable. The output of the address register is the address in the RAM that contains the code word composed of the N—1-tuple vector of secondary state variable values for the next state (NS). The RAM output can be wider than the N—1 bit code word. The remaining RAM output bits are used as external output lines that can serve as control bits and terminal state detection indicators. The terminal state function indicators are the binary encoded output values for the present state (s(t)) present input (i(t)) combinations, e.g., $S_T = \omega(s(t), i(t))$.

Figure 6:
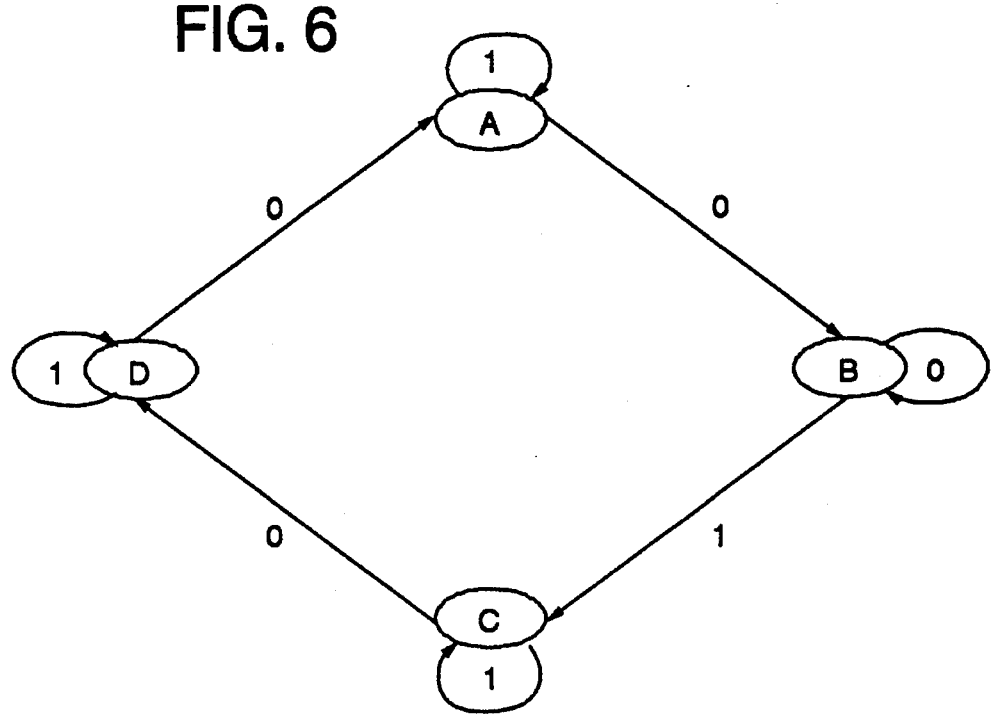
FIG. 6 shows the state diagram of an example 4 state machine, in accordance with the invention.
Figures 7, 8, 9:
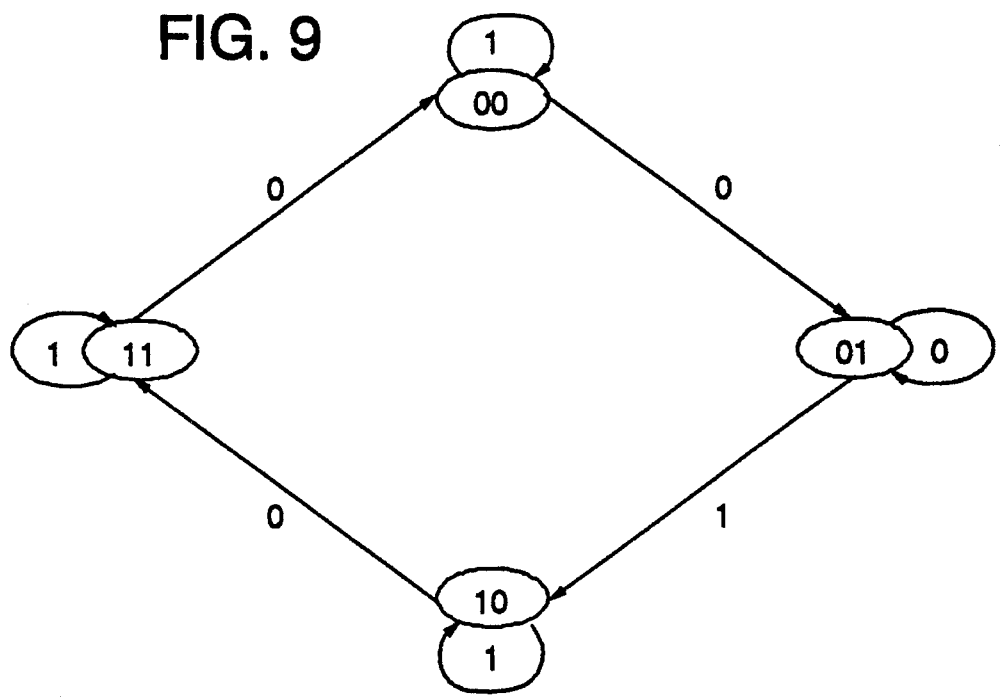
FIG. 7 shows the state table for an example 4 state machine, in accordance with the invention.
FIG. 8 shows the state variable assignment for the example 4 state machine, in accordance with the invention.
FIG. 9 shows the encoded state diagram for the example 4 state machine, in accordance with the invention.
Figures 10, 11:
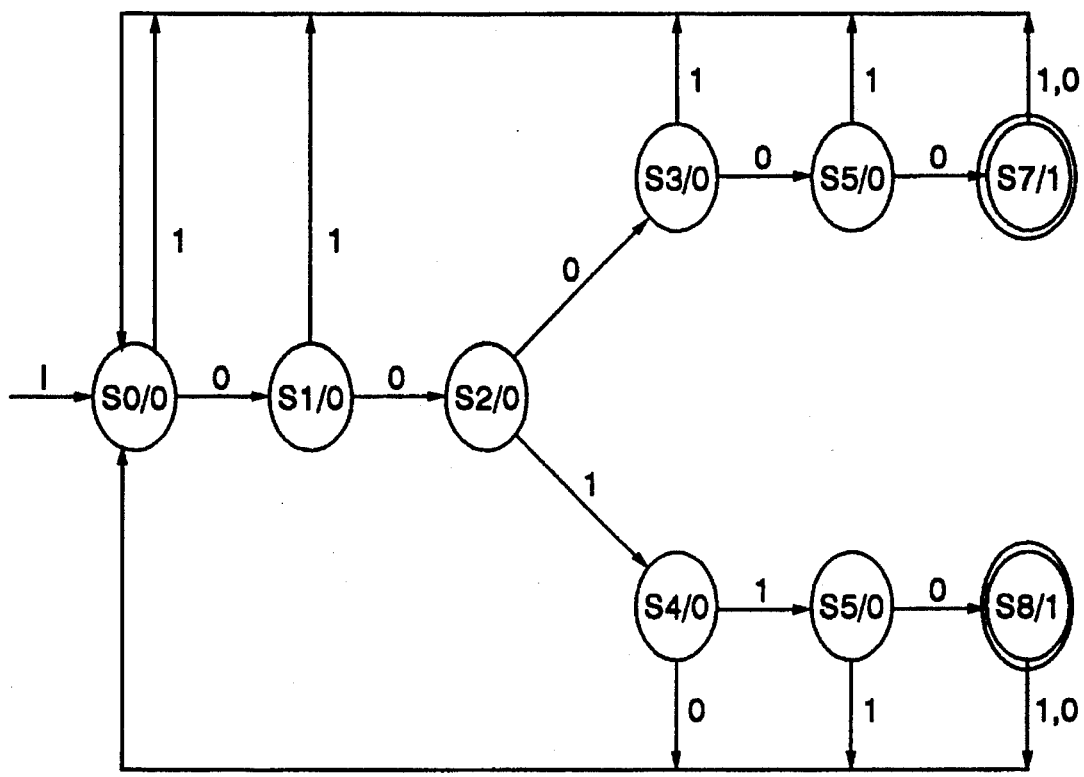
FIG. 10 shows the system design truth table for RAM implementation of the example 4 state machine, in accordance with the invention.
FIG. 11 shows the state diagram of 9 state machine, in accordance with the invention.

In order to clearly understand the RAM implementation, we preset a simple example of a 4 state machine. In FIGS. 6 and 7 we provide the state diagram and the state tablet respectively, for this four state machine. We require two state variables to encode these states as binary numbers. Let $q_1$ and $q_0$ denote these state variables. Then the state variable assignment is given in FIGS. 8. In FIG. 9 we present the encoded state diagram for the 4 state example. In FIG. 10 we present the the system design truth table for this example. Columns 1 and 2 in FIG. 10 contain the 2-tuple vector $(q_1 q_0)$ of SSA values for the present state (PS). Column 3 contains the value of the input variable $(X_i)$. Columns 1, 2, and 3 together form the RAM address in which the encoded value for the next state (NS) is stored. Columns 4 and 5 contain this 2-tuple vector $(q_1 q_0)$ of SSA values for the next state (NS). (Notice that FIG. 10 can also serve as the system design truth table for a D flip flop implementation. Each address bit of the RAM corresponds to a driving function for a D flip flop. Recall that we have selected RAM implementation rather than D flip flops in order to dynamically reconfigure the pattern detector FSMs with constant path delay, constant line loading, and constant signal timing. Furthermore, RAM implementation is presently more economical with respect to implementing more states within a smaller component area with less dollar cost.)

For the FSM with the state diagram shown in FIG. 9 we did not specify an initial state nor did we specify any terminal states. Let S0 denote the initial state, let ω denote the output symbol. When the value of ω equals 1 in the RAM lookup table, then the next state is a terminal state. States S7 and S8 are the terminal states for the FSM with state diagram and state table shown.

The number of feedback bits coming from the RAM depends on the total number of states in the recognizer FSMs that are implemented. Let RAM depth be defined as the number of RAM code words required to encode the states of the implemented recognizer FSMs. Thus RAM depth corresponds to the number of separate address locations in the RAM. We assume that the input variable has a binary value; therefore, two separate address locations are required in the the RAM lookup table implementation for each present state (i.e., one address location for each value of the input variable). Let NST denote the number of states in an PSM. Let NCWB denote the number of binary state variables needed to encode each of the states. Let NRA denote the number of address bits required for the SSA RAM lookup implementation. Let $\beta$ denote the number digits for the input variable that are accepted at the address register each bit-time. Then, $$NRA = \lceil \log_2(NST \times 2^\beta) \rceil \quad (4.14)$$

For example 1 in FIG. 4.59,
$NCWB_1 = \lceil \log_2 4 \rceil = 2$
$NRA_1 = \lceil \log_2 4 \times 2^1 \rceil = 3$
For example 2 in FIG. 4.61,
$NCWB_2 = \lceil \log_2 8 \rceil = 3$
$NRA_2 = \lceil \log_2 8 \times 2^1 \rceil = 4$ Let RAM width be defined as the number of bits in a RAM code word plus the number of external output lines required for control and pattern detection notification. For example, a RAM with depth 2000 and width 16 (e.g., 2000×2 bytes) can store 2000 12-bit RAM code words plus 4 bits of control and/or pattern detection indication per code word. As the number of states for the implemented FSM increases, the depth of the RAM increases. As the RAM depth increases, a larger address space is required and so the number of address bits increases. As the number of address bits increases the number of feedback bits increases. As the number of feedback bits increases, either the width of the RAM must increase to equal the number of address feedback bits, or the number of RAMs must expand to accommodate the number of RAM feedback bits.

4.75 EXTENSION TO HIGHER SPEED NETWORKS

Introduction

In this section we present our major contribution to performance measurement, the extension of the ICA to high speed networks. We provide examples that demonstrate the scalability of ICA to higher speed networks, and we show how to implement the secondary state assignment for RAM lookup table for higher speed networks.

Figure 13:
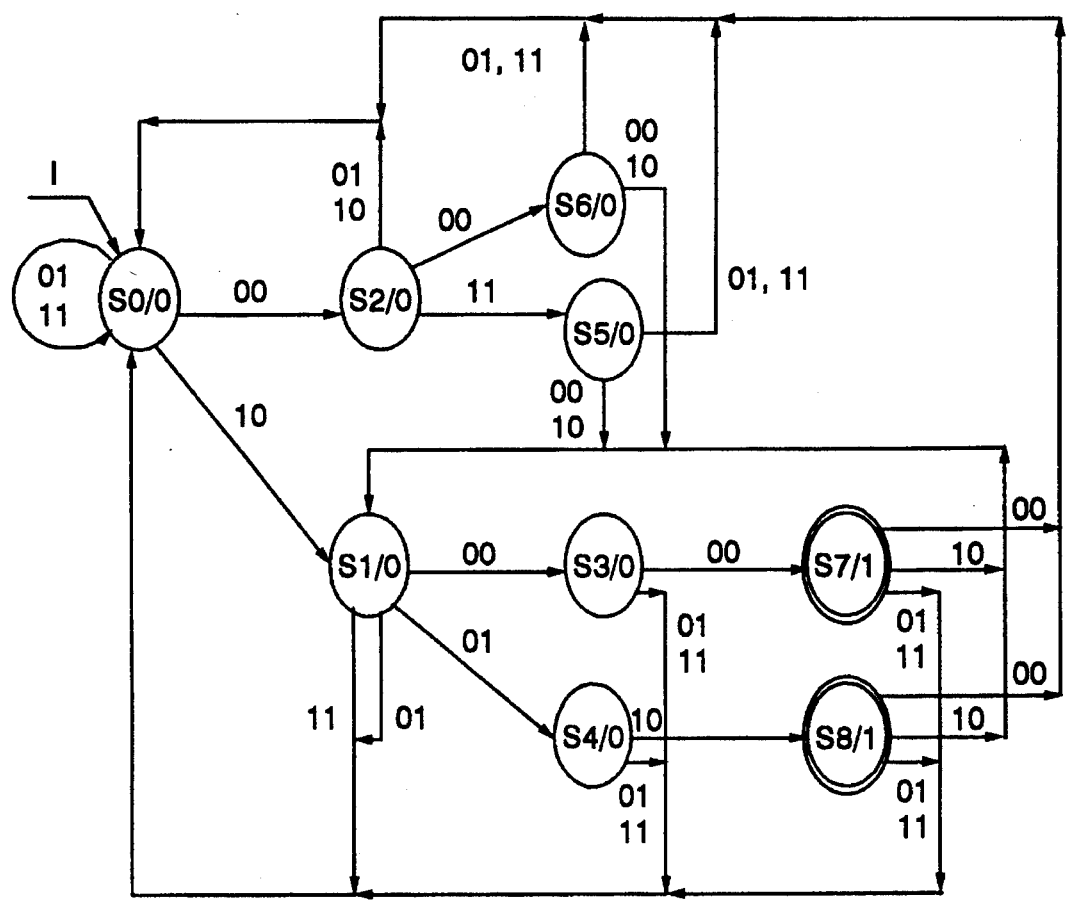
FIG. 13 shows the state diagram of 9 state machine with 2-tuple input variable value, in accordance with the invention.

Let the number of bits in the input variable equal 2 and construct a new state diagram with arcs from each predecessor state to its 4 possible 2-successor states. We present the resulting state diagram in FIG. 13 and the state table in FIG. 14, 14A and 14B. Let the present state equal S3 and the input variable value equal 00. The encoded SSA value of S3 and the value of the input variable are stored in the RAM address register until the next clock. When the next dock occurs, the output of the RAM address register becomes the address location in RAM where the encoded SSA value of the next state is stored. For this example the next state is S7 and the RAM address 001100. The value of the output symbol $\omega_1$ equals equals 1 at address 001100 because S7 is a terminal state. This value is sent to a terminal state counter over a dedicated RAM output line. As another example let the value of the input variable two-tuple equal 10 and the present state be S4. The encoded value of S4 and the value of the input variable are stored in the address register. On the next clock the RAM address becomes that where the encoded SSA value for state S8 is stored (e.g., 010010). State S8 is a terminal state; therefore, the value of $\omega$ equals 1. This value is passed to terminal state counter over a dedicated RAM output line, separate from that used for terminal state S7. Separate RAM output lines are required for such unique terminal state.

In FIG. 14, 14A and 14B we provide a state table for the case of a 2-tuple vector input variable for the FSM of our runner example.

4.7.6 IMPLEMENTATION FOR GIGABIT PER SECOND NETWORKS

Figure 15:
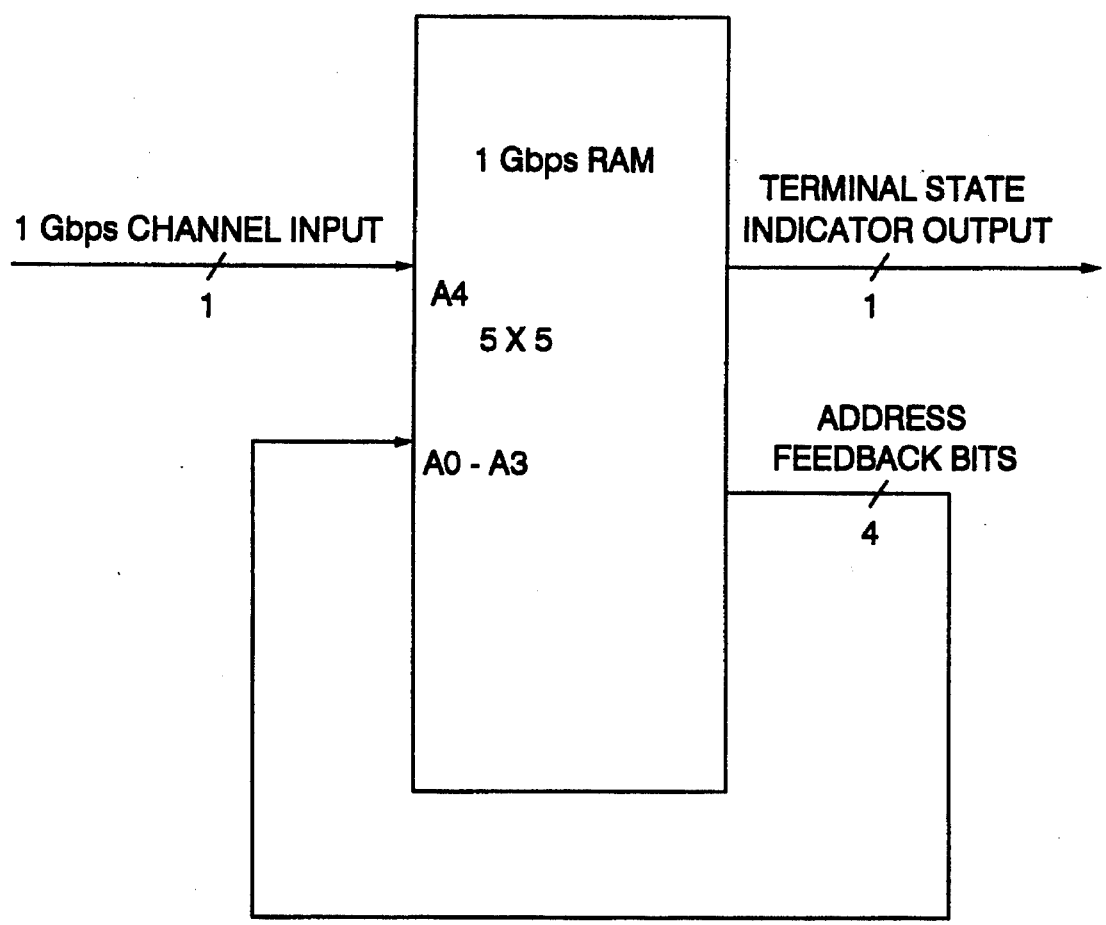
FIG. 15 shows the SSA implementation for SD detect with 1 Gbps RAM, in accordance with the invention.

Recall that the SD component machines for both FSMST1 and FSMST4 have 9 states. Therefore, from Eqn. 4.13 the number number of bits per RAM code word equals 4. If there existed a RAM that could operate at 1 Gbps with 16 million address locations. Then $\beta$ would equal 1, $NRA = 2^5 = 32$ by Eqn. 4.14, and NTIL (e.g., the number of terminal state indicator lines required for the RAM output) would equal 1. This RAM would require 5 total output lines as shown in FIG. 15.

Figure 18:
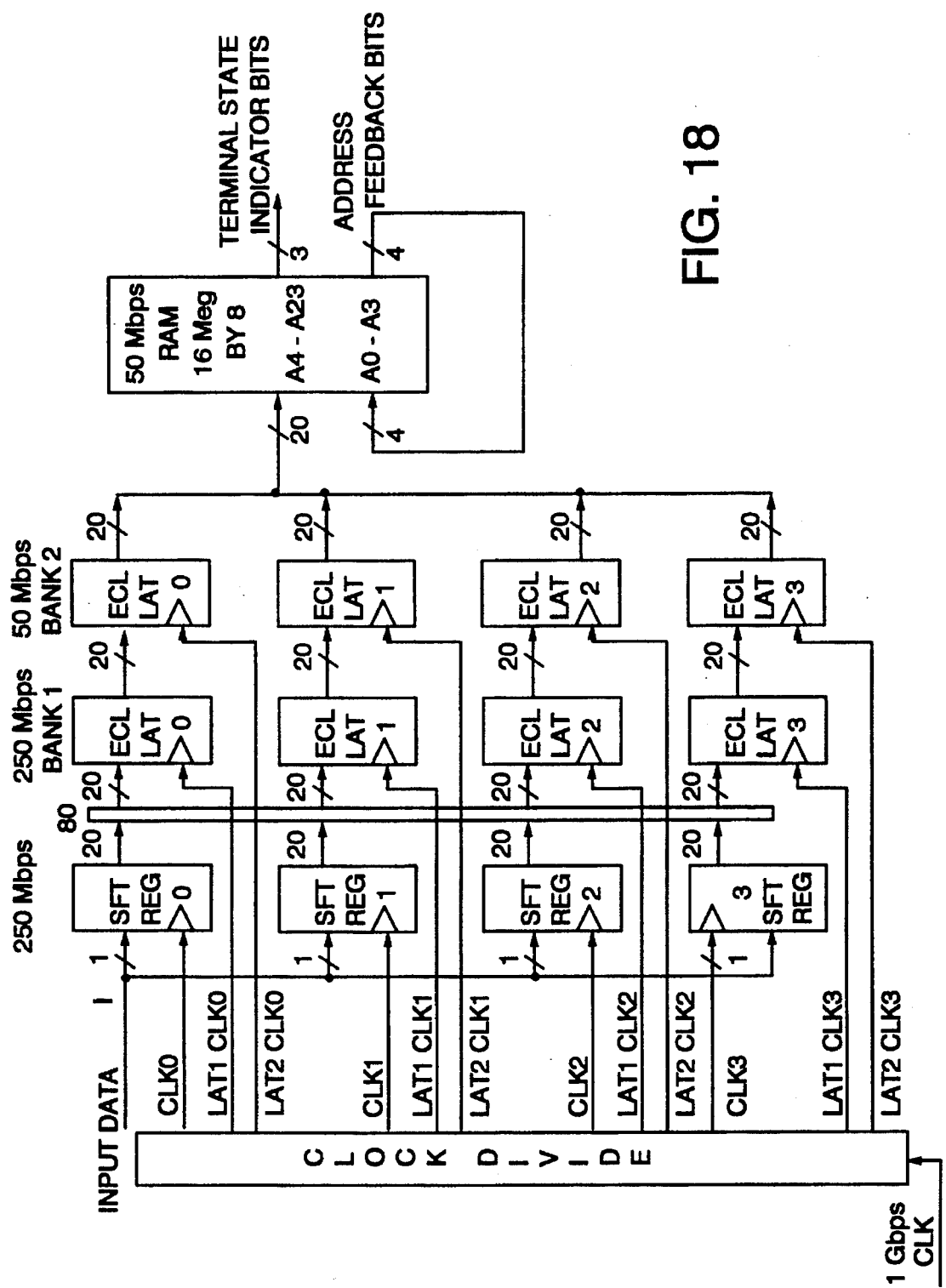
FIG. 18 shows the SSA implementation for SD detect with 50 Mbps RAM, in accordance with the invention.

No static RAM is presently available off-the-self that operates at 1 Gbps. Static RAMs are available off-the-self that operate at 50 Mbps. In order for a 50 Mbps RAM to accommodate a Gbps channel input an implementation architecture such as that shown in FIG. 18 is required. The front end circuitry for this architecture is composed of clock division logic, serial to parallel shift registers, and 2 banks of ECL latches.

Figure 16:
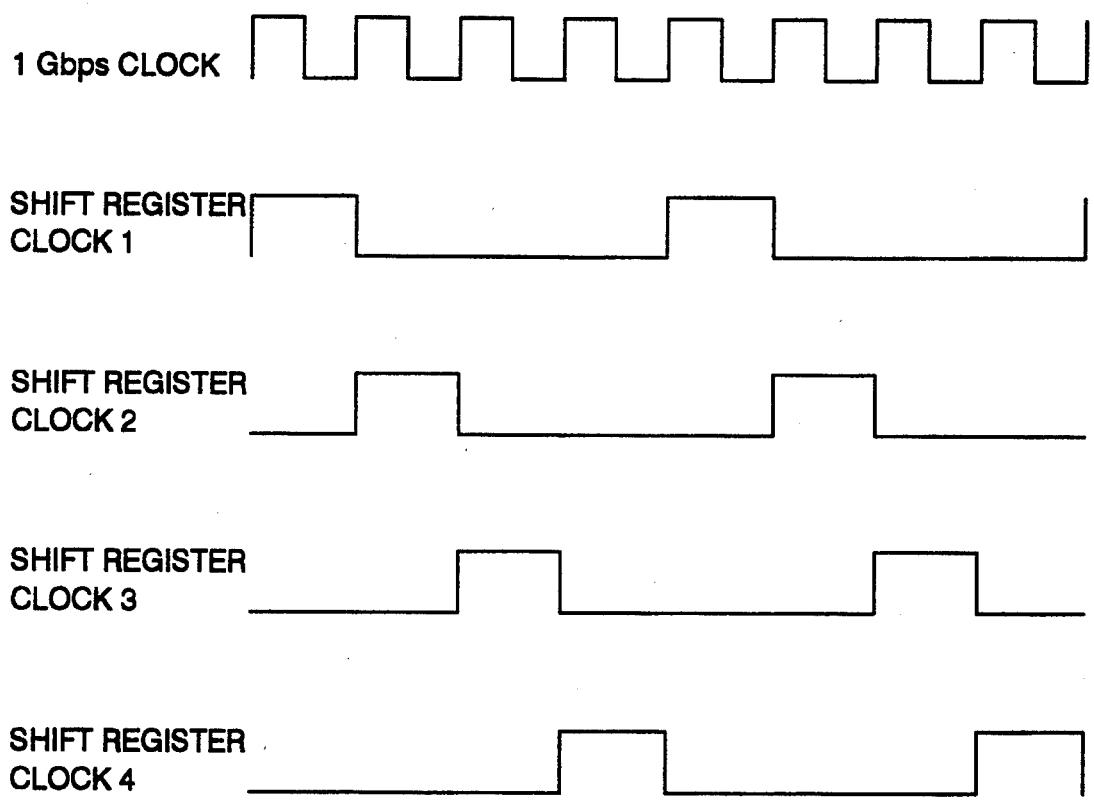
FIG. 16 shows the shift register clock derivation.

The first step in reducing the Gbps data rate for the SSA RAM lookup table implementation is to divide the Gbps clock to obtain a 500 Mbps, an inverted 500 Mbps clock, a 250 Mbps clock, and an inverted 250 Mbps clock. These four clocks are then combined to create four pulses that occur once every 4 clock cycles of the gigabit per second clock as shown in FIG. 16. The small mount of logic required to implement this clock shaping could be constructed with gallium arsenide technology. Each of these pulses serves as the clock for one of 4 Emitter Coupled Logic (ECL) serial-in parallel 20-bit-out shift registers [110]. These shift registers have a max/mum toggle rate of 300 Mbps but need to toggle only at 250 Mbps for clock signals 1 through 4.

The shift registers are loaded according to the following interleaving scheme. Bit 0 from the Gbps channel is clocked into bit position 0 of shift register 0, Bit 1 from the Gbps channel is clocked into bit position 0 of shift register 1. Bit 2 from the Gbps channel is clocked into bit position 0 of shift register 2. Bit 3 from the Gbps channel is docked into bit position 0 of shift register 3. Bit 4 from the Gbps channel is clocked into bit position 1 of shift register 1. This process continues until 80 bits from the Gbps channel have been clocked into the 4 shift registers. Then the process repeats. By using serial-in and 20-bits-out shift registers, we reduce the Gbps channel data rate to 50 Mbps. However, the interleaving scheme that we used permutes the bit ordering. To reorder the bits for presentation to the RAMs, we use two banks of ECL latches [110].

Figure 17:
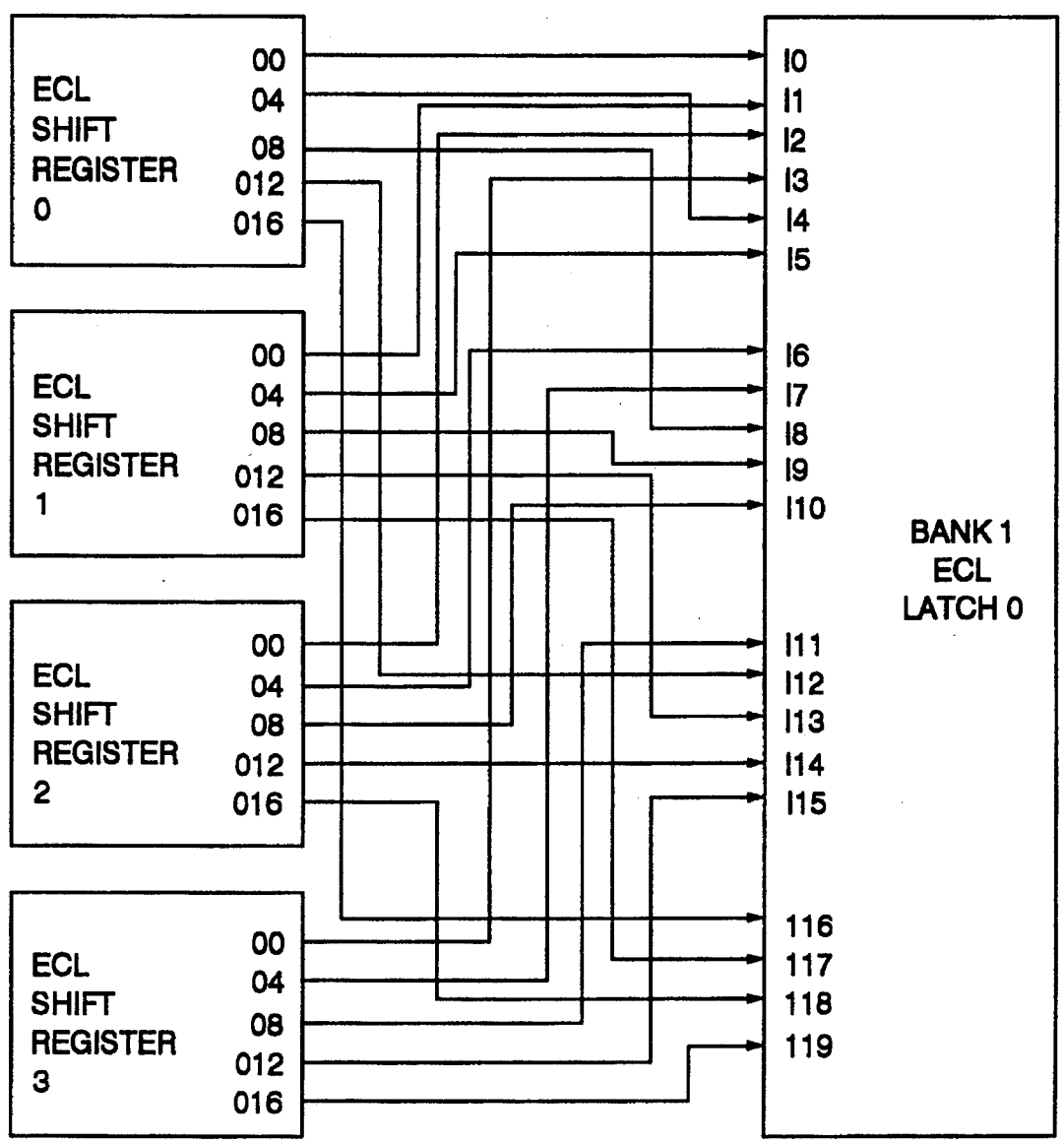
FIG. 17 shows the permutation wiring for ECL bank 1 latch 1, in accordance with the invention.

The purpose of ECL latch bank 1 is to place the data bits from the shift registers into the original channel bit order. To achieve this we use permutation wiring from the shift registers to the latches. Bit position 0 from shift register 0 is wired to bit position 0 of ECL bank 1 latch 0. Bit psoition 0 from shift register 1 is wired to bit position 1 of ECL bank 1 latch 0. Bit psoition 0 from shift register 2 is wired to bit position 2 of ECL bank 1 latch 0. Bit psoition 0 from shift register 3 is wired to bit position 3 of ECL bank 1 latch 0. Bit psoition 1 from shift register 0 is wired to bit position 4 of ECL bank 1 latch 0. The permutation wiring for ECL bank 1 latch 0 is shown in FIG. 17. The expression for this permutation is given in Eqn. 4.19. Let $n_r$ denote the number of serial to parallel shift registers. Let $n_b$ denote the bit number from the serial Gbps channel, where $n_b \in \{0,1,2,\ldots b\}$. Let $n_p$ denote the number of the shift register into which data bit p is placed. Let the two-tuple $(n_p, n_b)$ denote the present shift register chip and the present channel bit. Let the two-tuple $(n_p, n_b)$ denote the present shift register chip and the present channel bit. Then the permutation for the wiring that reorders the bits form the output of the shift registers to the input of the bank 1 ECL latches is given by:

$$(n_p, n_b) \rightarrow ([\mathrm{mod}_{n_r}(n_b)], [n_r \lfloor n_b/n_r \rfloor + n_p]) \quad (4.19)$$

where $\lfloor x/y \rfloor$ means the least integer value of X divided by y. To achieve the proper timing for bit reordering we clock the contents of shift register 0 into ECL latch 0 of ECL-bank 1 with the 250 Mbps clock on the 77th bit-time of the Gbps clock. On the 78th bit-time of the Gbps clock, the contents of shift register 1 are clock into ECL latch 1 of ECL bank 1 with the 250 Mbps clock. On the 79th bit-time of the Gbps clock, the contents of shift register 2 are clock into ECL latch 2 of ECL bank 1 with the 250 Mbps clock. On the 80th bit-time of the Gbps clock, the contents of skirt register 3 are clock into ECL latch 3 of ECL bank 1 with the 250 Mbps clock.

After the first 80 bits have been clocked into ECL bank 1, the outputs of the ECL bank 1 latches are output enabled and their contents are sent to the corresponding inputs of the ECL bank 2 20-bit latches. There is no permutation wiring between these banks of latches. The output enable signals for the ECL bank 1 latches are synchronous with a 50 Mbps clock that is derived from the Gbps clock division circuitry. Each ECL bank 2 latch uses this 50 Mbps clock to clock in the data from the ECL bank 1 latches. Each ECL bank 2 latch is may be tri-stated so that only one ECL latch is output enabled every fourth 50 Mbps clock cycle.

Recall that the SD component machines for both FSMST1 and FSMST4 have 9 states. Therefore, from Eqn. 4.13 the number number of bits per RAM code word equals 4. If there existed an SRAM that could operate at 50 Mbps with $2^{20+4}=2^{24}=16$ million address locations, then NTIL (e.g., the number of terminal state indication lines required for the RAM output). These RAMs operate at speeds of up to 50 Mbps because write cycle time plus chip enable time equals 20 ns or 50 Mhz. For implementation with these RAMs we require 16 1 meg by 1 RAMs. Each RAM receives the 20 bits output from the ECL latches. 16 CMOS loads may require redrive circuitry form the ECL latches for each address line. Let SDTTR denote one of the 1 meg by 1 RAMs that store the values of the system design truth table.

The 1 megabit by 1 RAM has enough address bits to accommodate the input lines but there are none left for the address feedback lines. For this implementation rather than requiring that each RAM have NCWB=4 feedback bits to determine the address of the next state in the RAM look up table, we can use the chip enable (CE) inputs of each RAM. To do so, we send the output bits of all 16 SDTTR RAMs to a $2^{16}$=64K by 16 static RAM called the chip enable RAM. We require 64K memory locations to accommodate the 16 address lines (e.g., $2^{16}$=64K). The maximum speed operating speed for this RAM is 50 Mbps (i.e., the same as that of the 16 SDTTR RAMs). The chip enable RAMs may be implemented with two 32K by 8 static RAM that are available off-the-shelf [103]. The 16 outputs of the chip enable RAM serve as the 16 chip enables for the 16 SDTTR RAMs. Each output from the chip enable RAMs enables one of the SDTTR RAMs (e.g., enables 1 meg of the 16 meg total memory available for the system design truth table). In addition to the chip enable RAM we require a separate terminal state indicator RAM. We have determined that NTIL=3; therefore, we could use an off-the-self 50 Mbps 64K by 4 static RAM to implement the terminal state indicator RAM [103]. Thus, the total amount of circuitry required to implement either the FSMST1 or FSMST4 the SD component machine includes: gallium arsenide clock division circuitry for Gbps clock division circuitry, 4 serial-in to 20-bit-out shift registers, 4 20-bit ECL latches, re-drive circuitry from the latches to the SDTTR RAMs, 16 1 megaword (e.g., meg) by 1 50 Mbps static RAMs, two 32K by 8 static RAMs, and one 64K by 4 static RAM. This implementation would fit onto a single personal computer adapter card and would cost less than $1000. This amount of circuitry and the associated cost will drop dramatically as RAM technology density and speed increases.

The SD component machine has only 9 states, as the number of states increase, so does the amount of circuitry required to implement the SSA RAM look up table. For example the token ending delimiter (TKED) detect pattern detection FSM requires 23 states for FSMST1 or 27 states for FSMST4. For each of these structures, we require NCWB=5. To implement the SSA RAM look up table with 50 Mbps RAMs we require NAB=20+5=25 address bits or 32 million address locations. In FIG. 20, 20A, 20B and 20C we show a possible implementation for the TKED component machine for FSMST1. We use the same front-end clock division, ECL shift register, and ECL latch circuitry as for the SD component machine implementation. We double the number of 1 meg by 1 50 Mbps SDTTR RAMs so that we have 32 meg of addressable memory locations. We separate these RAMs as the low order 16 meg memory (e.g., memory locations 1 to 16 meg) and the high order 16 meg memory (e.g., memory locations 16,000,001 to 32 meg). The output bits of the low order 16 meg memory go to two 32 k by 8 25 Mbps static RAMs that are used for chip enable for the low order SDTTR RAMs. Likewise the output bits of the high of terminal state indicator lines required for the RAM output) would equal [20/9]=3. Thus the RAM would require 4+3=7 total output lines as shown in FIG. 18.

Figure 19:
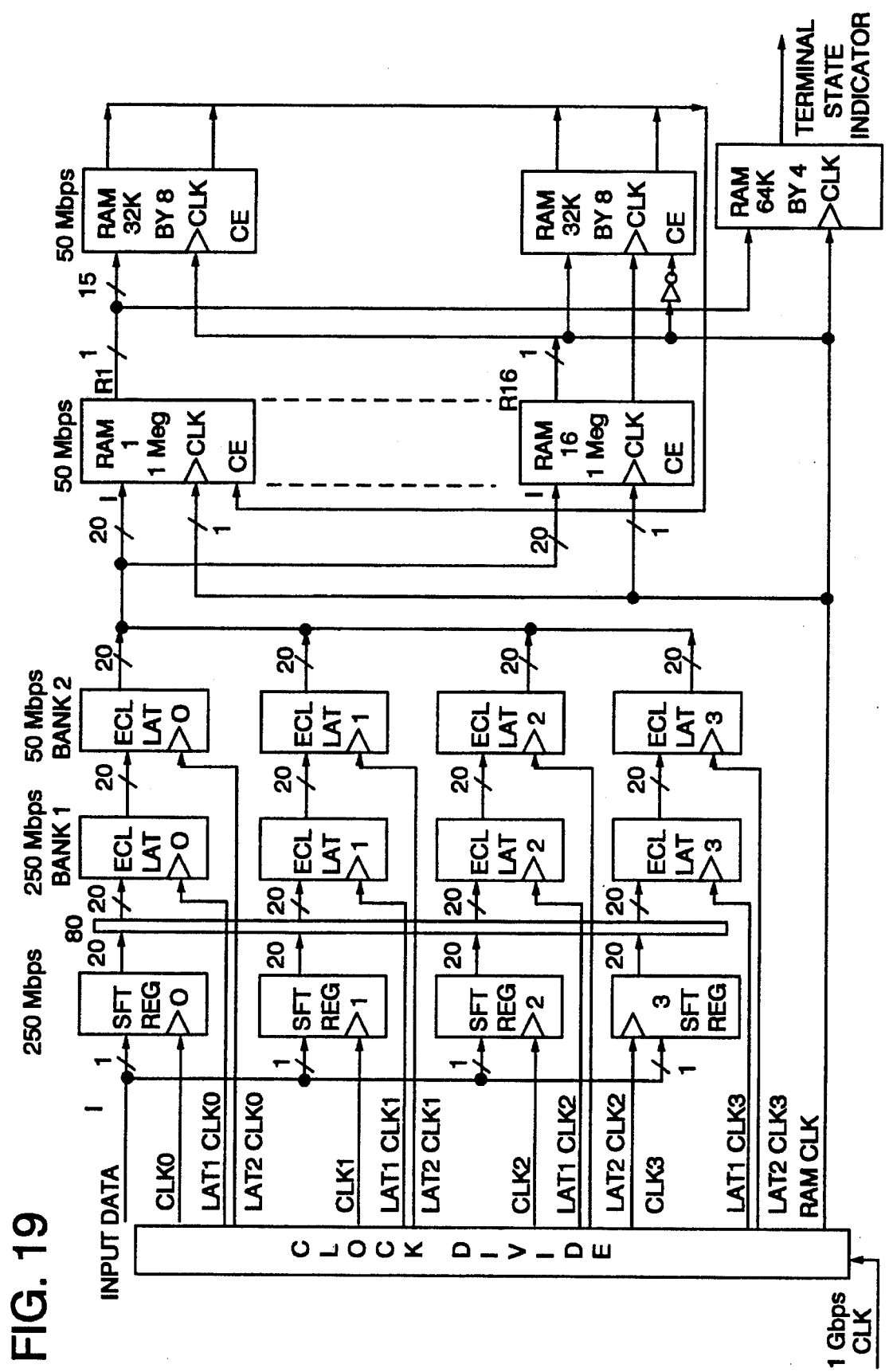
FIG. 19 shows the SSA implementation for SD detect with 50 Mbps off-the-shelf RAMs, in accordance with the invention.
Figure 20B:
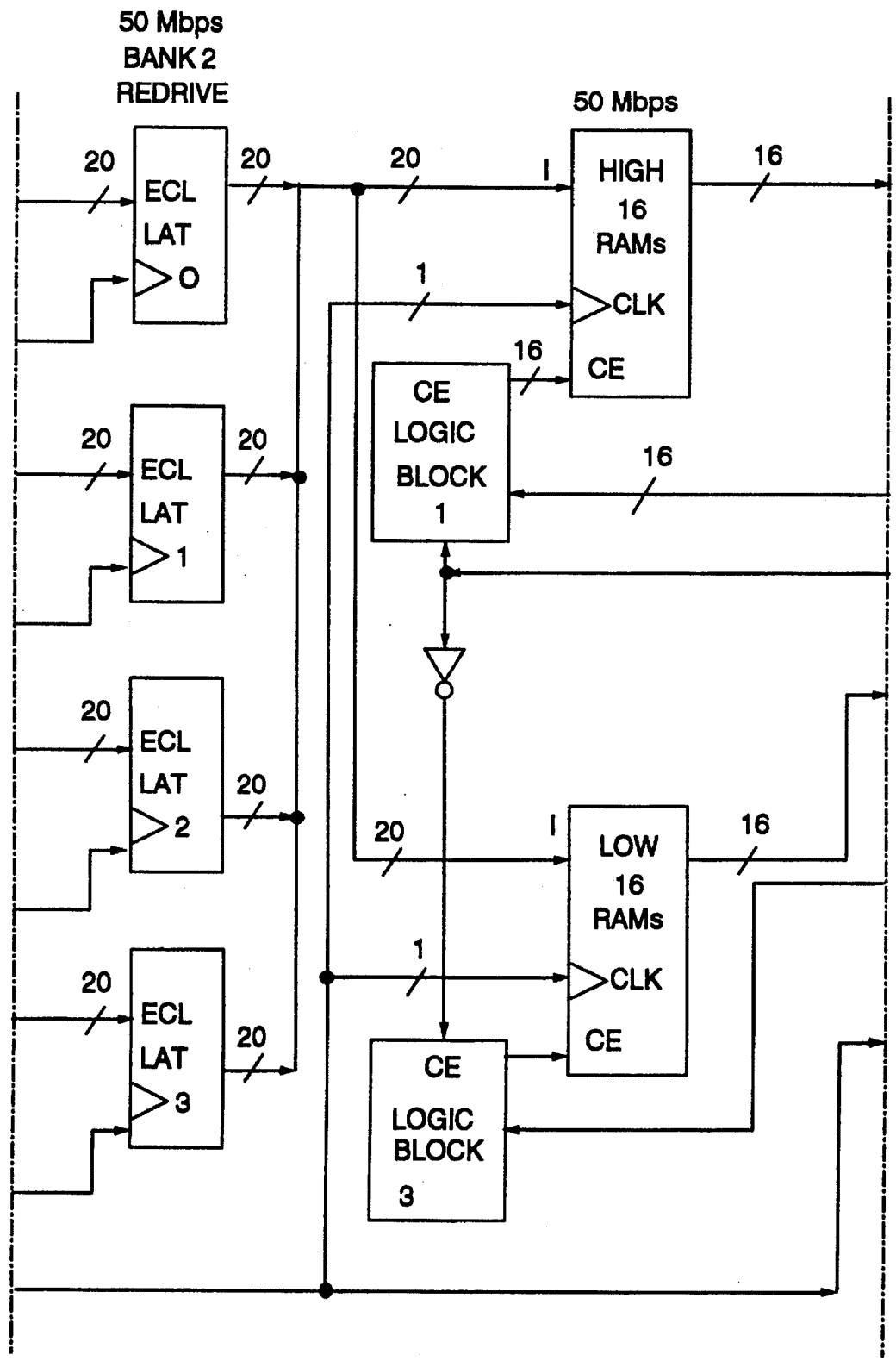
Figure 20C:
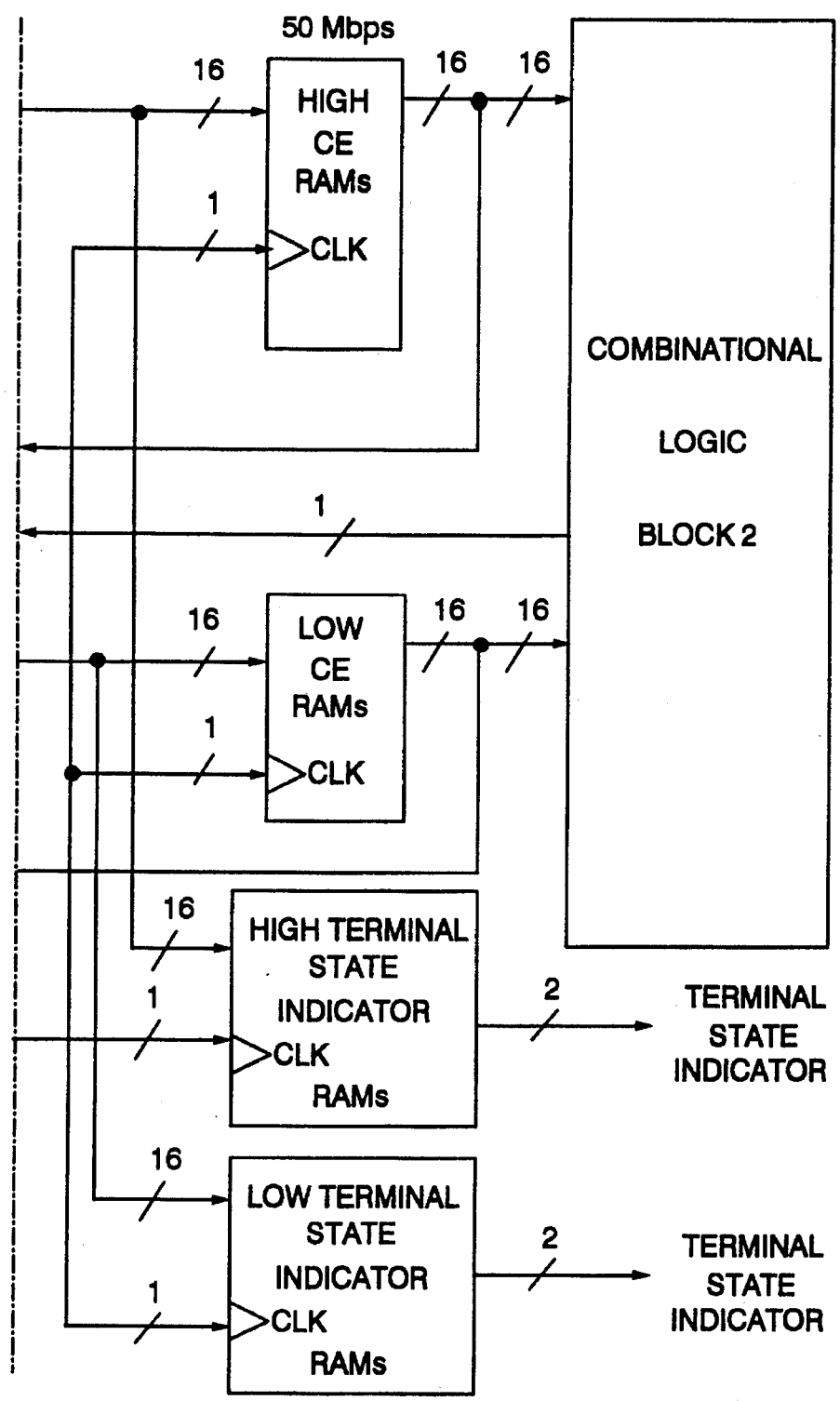

Although 50 Mbps static RAMs are available off-the-self in Complementary Metal Oxide Semiconductor (CMOS) technology, none are available with the desired configuration. In FIG. 19 we provide an implementation for the SSA RAM look up table for the SD FSM for FSMST1 and FSMST4. Presently, 1 meg by 1 RAMs (e.g., a RAM with 20 address lines, 1 million memory locations, and 1 output line) are available with read address access cycle time of 12 ns, write cycle time of 12 ns, and chip enable to write time of 8 ns [103]. order 16 meg memory go to two 32 k by 8 25 Mbps static RAMs that are used for chip enable for the high order SDTTR RAMs. The 16 output bits of the low order chip enable RAMs go to combinational logic blocks 1 and 2 in FIG. 20, 20A, 20B and 20C. The 16 output bits of the high order chip enable RAMs go to of combinational logic blocks 1 and 3 in FIG. 20, 20A, 20B and 20C. Combinational logic block 1 derives a single output bit that is sent directly to combination logic block 2. The output of combinational logic block 1 is also inverted and sent to combinational logic block 3. Combinational logic block 2 receives the 16 output bits from the low order chip enable RAMs and, if the output from block 1 is high, provides chip enables to the low order SDTTR RAMs. Combinational logic block 3 receives the 16 output bits from the high order chip enable RAMs and, if the output from block 1 is low, provides chip enables to the high order SDTTR RAMs. We also require two 64K by 4 static RAMs for the TKED terminal state indicator RAMs. For this example NTIL=1×[20/9]=3 therefore we could use a 25 Mbps 64K by 4 static RAM to implement the terminal state indicator RAM.

Figure 21A:
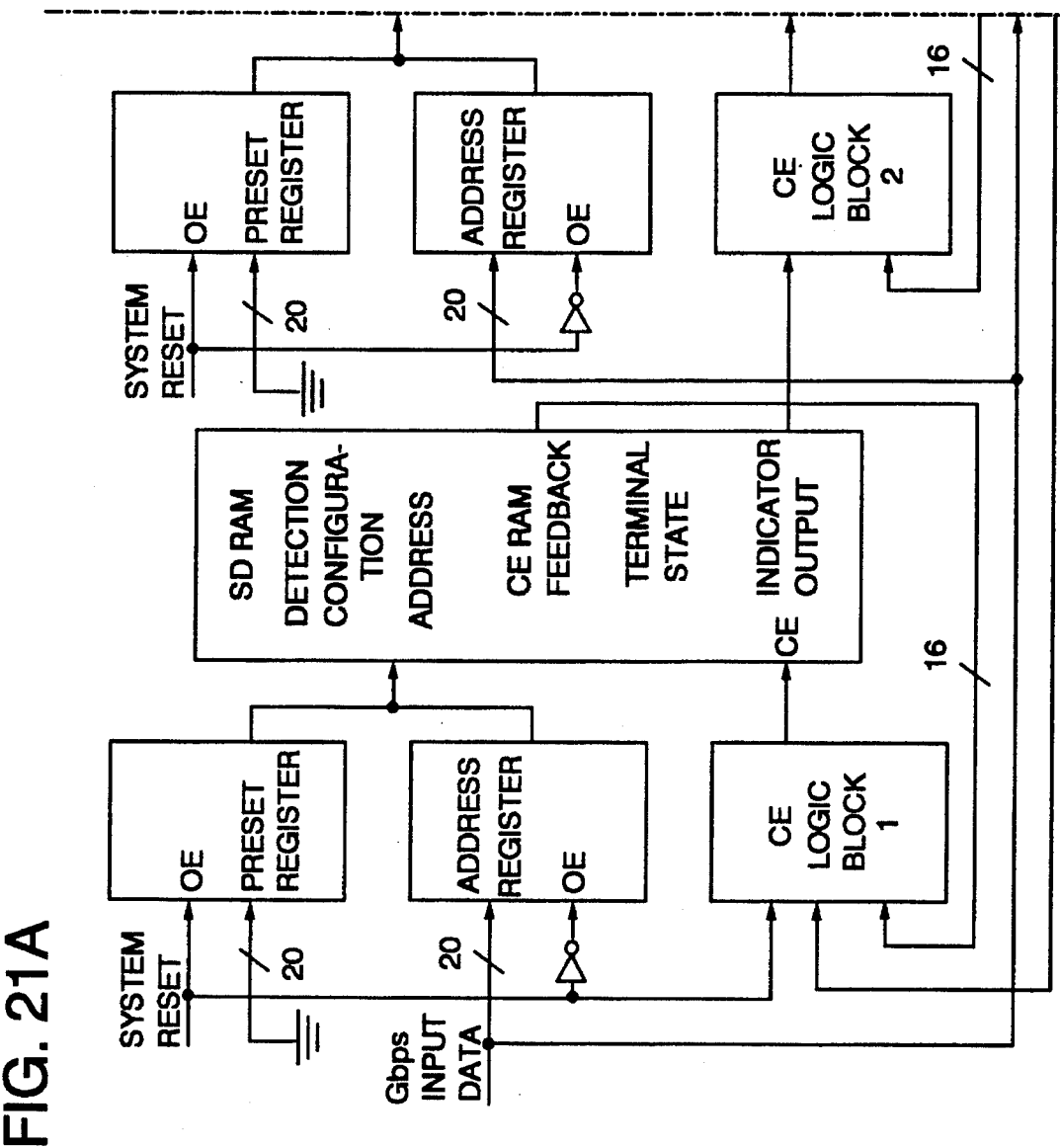
FIG. 21, 21A and 21B shows the SSA implementation for the FSMST4 TKED with 50 Mbps off-the-shelf RAMs, in accordance with the invention.
Figure 21:
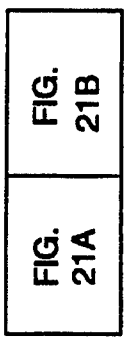
Figure 21B:
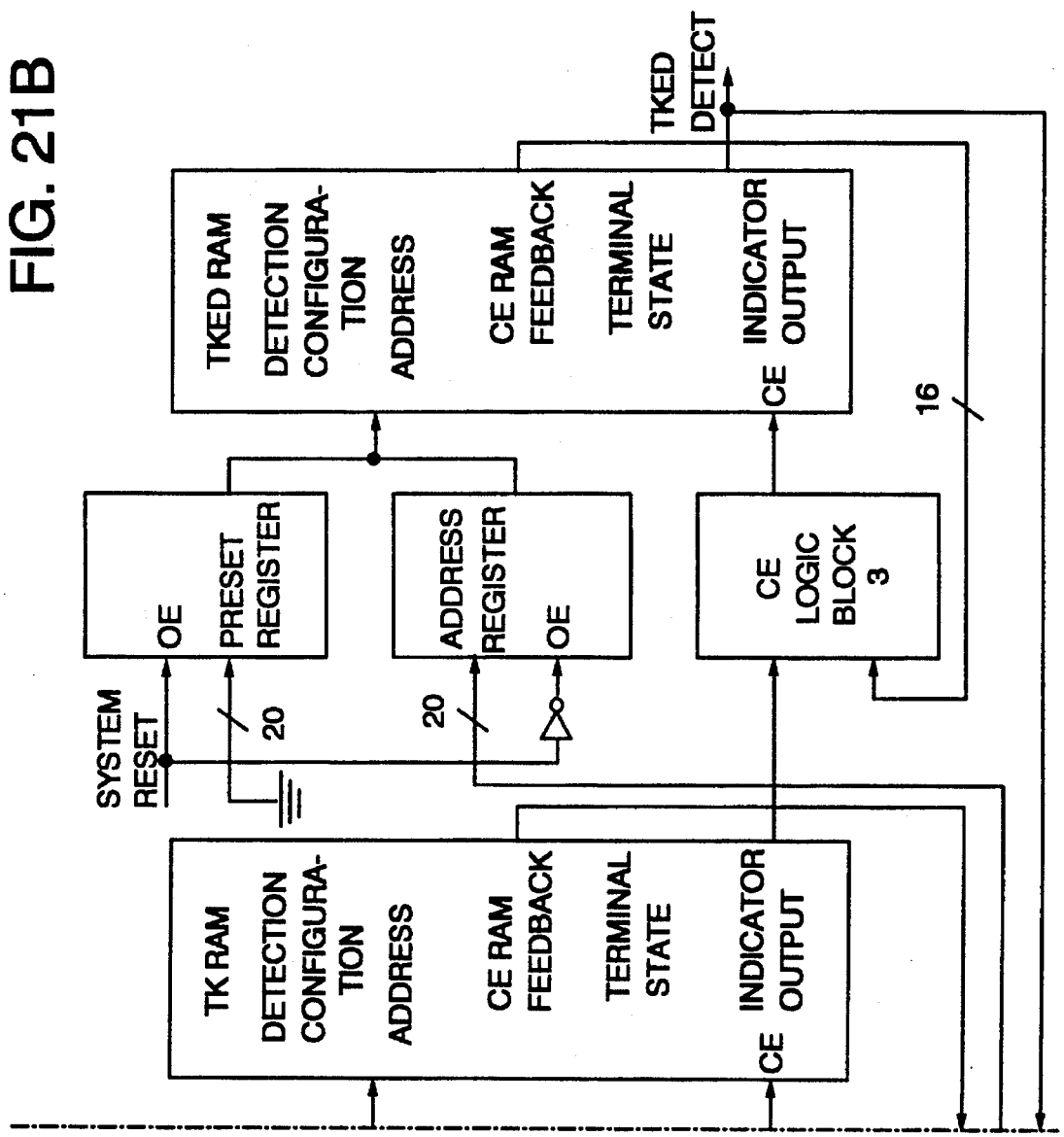
Figures 22, 22A:
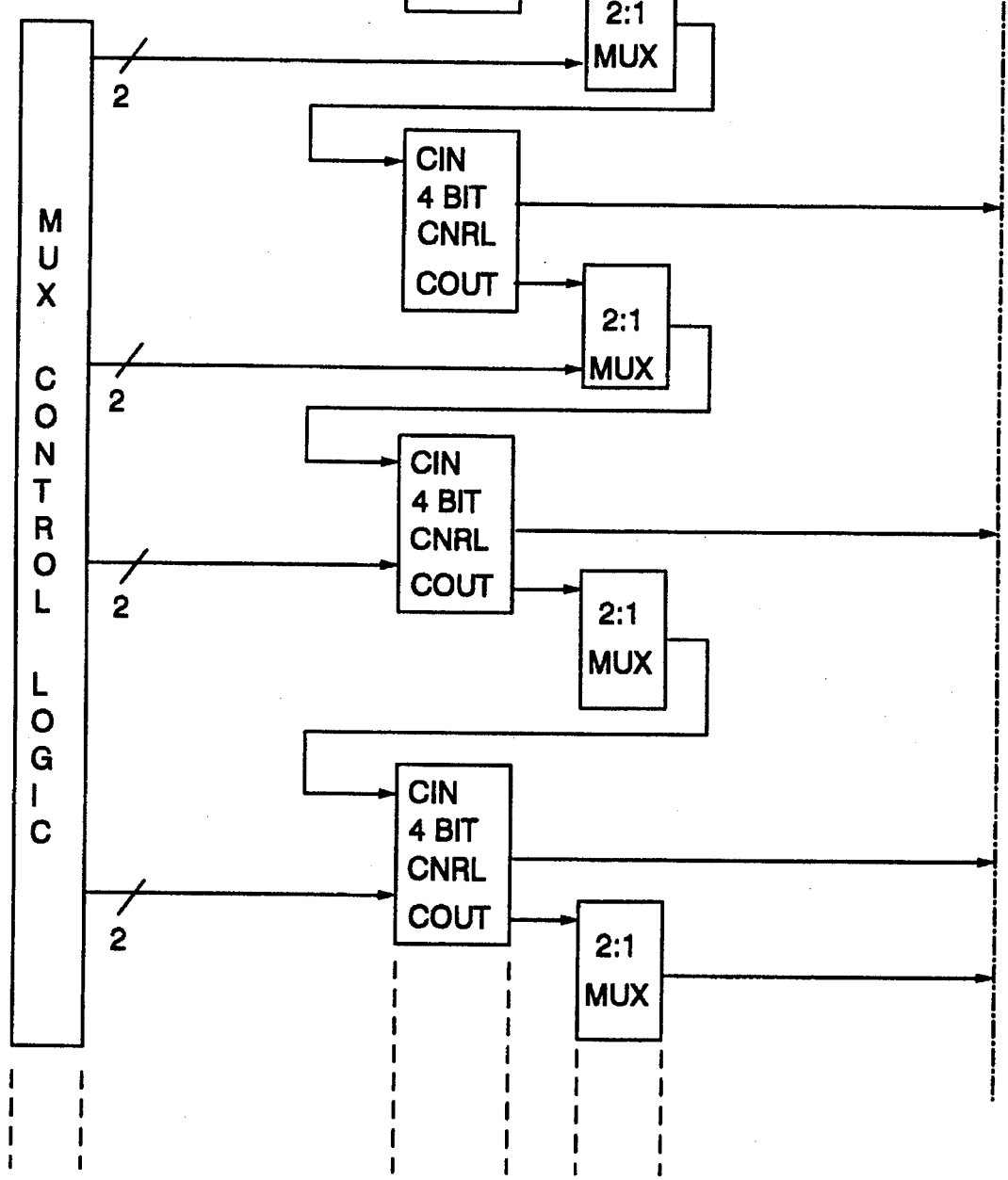
FIG. 22, 22A and 22B shows the array of counters for high speed application, in accordance with the invention.
Figure 22B:
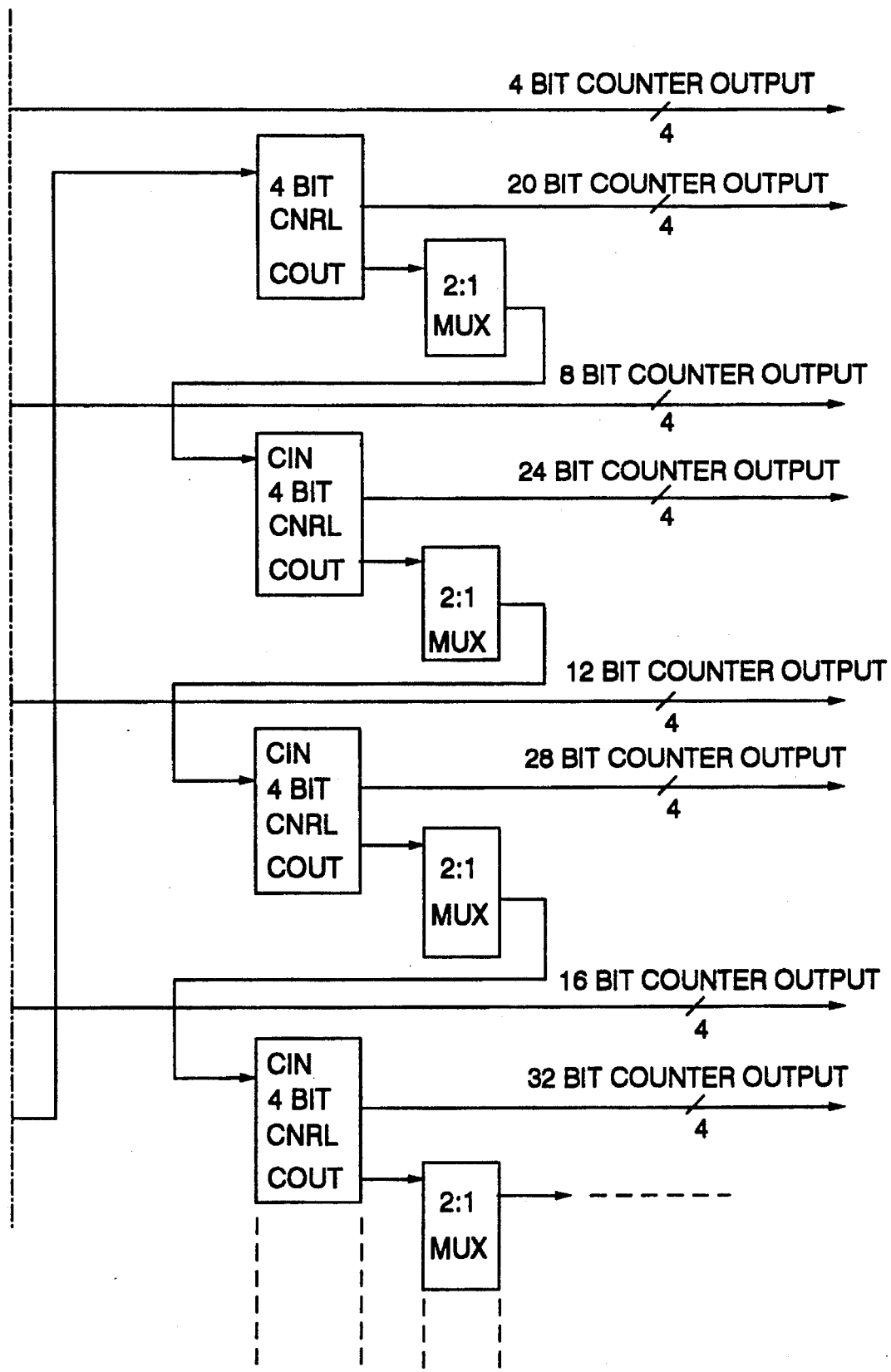

In FIG. 21, 21A and 21B we show a possible implementation for the TKED component machine for FSMST4. We use a similar implementation for the SD, TK, and TKED component machines as for the SD component machine implementation in FIG. 19 because each of these component machines have 9 states. Recall that for the FSMST4 structure that the terminal state indicator for the SD component machine serves as the Reset symbol for the TK component machine and that the terminal state indicator for the TK component machine serves as the Reset symbol for the TKED component machine. As shown in FIG. 21, 21A and 21B, we implement this structure by sending the 3 terminal state indicator bits of the SD component machine into the CE logic block 2. CE logic block 2 includes a logic OR gate function that provides a high logic level whenever one of these three signals is high. This high logic level signal, called the SD combined terminal state indicator signal, serves as the Reset signal for the TK machine. Within CE logic block 2, this Reset signal is then combined with each of the 16 chip enable signals from the TK chip enable RAMs. If the output of the SD combined terminal state indicator signal is high, then chip enables for the TK component machines are activated and the chip enable signals are latched. Thus, the component machine Reset is implemented. Likewise, when any of the three terminal state indicators for the TK component machine have a value of 1, the TKED component machine is chip enabled. The terminal state indicator RAM signals from the TKED component machine are sent to CE logic block 1 of FIG. 22, 22A and 22B where they are combined with the system Reset to generate TKED combined terminal state indicator signal This signal is combined with each of the 16 signals from the SD chip enable RAMs to provide chip enable for the SD SDTTR RAMs. The TKED terminal state indicator RAM signals are also sent to the TKED pattern detection counter. This counter provides a count of the number of tokens that occur during the measurement time interval (MTI) which serves as the MIR for utilization measure $U_{T1}$ (U.S. Ser. No. 08/1024575 cited above). Recall that the pattern detection counters must operate at the speed of the RAMs e.g., 50 Mbps for the 1 Gbps TKED example): Field Programmable Gate Arrays (FPGAs) can be used to implement the pattern detection counters if the count frequency is below 16 Mbps. For higher counting frequency requirements, one alternative is to use an array of ECL universal counters [110]. FIG. 22, 22A and 22B shows an array of 4-bit counters, muxes, and mux control. One input to each mux is the carry-out signal from a 4-bit counter. The other input is a logic low level signal from the mux control logic. The mux control logic also determines which mux input to pass to the mux output. The mux control logic is configured at system reset and can be implemented with a set of TTL latches. The mux output becomes the carry-in signal to a different 4-bit counter. By so connecting the 4-bit counter carry-out and carry-in signals we can configure the array of counters to include a number of different counters with a choice of sizes (e.g., 4-bit, 8-bit, 12-bit, 16-bit, etc.). ECL counters are available with clocking frequencies that exceed 100 Mhz. Thus, 50 Mbps counters are realizable with off-the-self technology. In addition to the speed advantages over the FPGA implementation, the array of counters implementation also provides dynamic reconfiguration advantages such as consistent signal path delays, line loading, and layout. Therefore, each new counter configuration will meet the signal timing specifications. A disadvantage of the ECL array of counters implementation is the potentially larger amount of circuitry and the associated expense for large counter arrays. To overcome these short comings we could implement the counters, muxes, and control logic within a single VLSI component. For example, IBM presently produces VLSI components that operate above 50 Mhz that can accommodate 800 8-bit counters and the associated muxes and control logic.

Although a specific embodiment of the invention has been disclosed, it will be understood by those having skill in the art that changes can be made to that specific embodiment without departing from the spirit and the scope of the invention.

BIBLIOGRAPHY

[16] K. J. Barker and C. S. Lingafelt, "Programmable digital filter," IBM technical disclosure bulletin, vol. 31, no. 2, July 1988, pp. 198–204.

[60] P. C. Hershey, J. G. Waclawsky, K. J. Barker and C. S. Lingafelt, "Event Driven Interface for a System for Monitoring and Controlling a Data Communications network," U.S. patent application Ser. No. 08/024563, Mar. 1, 1993, now abandoned.

[103] MICRON Semiconductor, Inc., SRAM 1993 Data Book, Boise, Id. Jan. 1993.

[110] Philips Components—Signetics, 10/100K ECL Logic/ Memory/PLD Data Handbook, Sunnyvale, Calif., 1990.

What is claimed is:

1. A system for adaptive, active monitoring of a serial stream of data having a characteristic pattern using a plurality of finite state machines, comprising:

a shift register, having an input coupled to said serial bit stream and at least two sequential bit stages in cascade, a first stage for buffering a first occurring binary bit and a second stage for buffering a sequentially second occurring binary bit;

a first n-bit address register having in sequential order a first portion with n-1 bits indicative of a previous address in a first finite state machine and a second portion with one bit and an input to said second portion coupled to said first stage of said shift register, for receiving a bit from said serial bit stream;

first addressable memory having a plurality of data storage locations, said first memory having an n-bit address input coupled to the first and second portions for receiving from said first and second portions as an output of said first address register, said first memory configured with data stored in first and second ones of said data storage locations in sequential order to represent at least a first portion of a digital filter for said characteristic pattern;

logic means having an input coupled to an output of said first memory, for converting said data output from said first data storage location into feedback data output on a feedback path to said first register, for transferring said feedback data to said first portion of said first address register, for concatenation with said bit from said first stage to form an address for said second one of said data storage locations of said first memory;

a second n-bit address register having in sequential order a first portion with n-1 bits indicative of a previous address in a second finite state machine and a second portion with one bit and an input to said second portion thereof coupled to said second stage of said shift register, for receiving a bit from said serial bit stream;

second addressable memory having a plurality of data storage locations, said second memory having an n-bit address input coupled to the first and second portions for receiving from said first and second portions as an output of said second address register, said second memory configured with data stored in first and second ones of said data storage locations in sequential order, to represent at least a second portion of a digital filter for said characteristic pattern;

said logic means having an input coupled to an output of said second memory, for converting said data output from said first data storage location therein, into said feedback data output on said feedback path to said second register, for transferring said feedback data to said first portion of said second address register, for concatenation with said bit from said second stage to form an address for said second one of said data storage locations of said second memory; and output signal generation means coupled to said feedback path, for outputting a pattern detection alarm in response to said digital filter detecting said characteristic pattern.

2. The system of claim 1, wherein said first address register and said first addressable memory are formed in a first integrated circuit chip; and said second address register and said second addressable memory are formed in a second integrated circuit chip, coupled to said first integrated circuit chip.

3. The system of claim 1, wherein said first address register and said first addressable memory are formed in a first multi-tasking memory partition of a data processor; and said second address register and said second addressable memory are formed in a second multi-tasking memory partition of said data processor, coupled to said first memory partition.

4. The system of claim 1, wherein said characteristic pattern is a bit pattern in a data communications medium.

5. The system of claim 4, wherein said characteristic pattern is a bit pattern in a data communications protocol.

6. A system for adaptive, active monitoring of a serial stream of data having a characteristic pattern using a plurality of finite state machines, comprising:

a shift register, having an input coupled to said serial bit stream and at least two sequential bit stages in cascade, a first stage for buffering a first occurring binary bit and a second stage for buffering a sequentially second occurring binary bit;

a first n-bit address register having in sequential order a first portion with one bit and an second portion with n-1 bits indicative of a previous address in a first finite state machine and an input to said second portion coupled to said first stage and second stage of said shift register, for receiving two sequential bits from said serial bit stream;

first addressable memory having a plurality of data storage locations, said first memory having an n-bit address input coupled to the first and second portions for receiving from said first and second portions as an output of said first address register, said first memory configured with data stored in first and second ones of said data storage locations in sequential order to represent at least a first portion of a digital filter for said characteristic pattern;

said first memory having an output for said data from said first data storage location to a first feedback path input to said first register, for transferring said data to said first portion of said first address register, for concatenation with said n-1 bits from said shift register to form an address for said second one of said data storage locations of said first memory;

a second n-bit address register having in sequential order a first portion with one bit and an second portion with n-1 bits indicative of a previous address in a second finite state machine and an input to said second portion thereof coupled to said first and second stage of said shift register, for receiving two sequential bits from said serial bit stream;

second addressable memory having a plurality of data storage locations, said second memory having an n-bit address input coupled to the first and second portions for receiving from said first and second portions as an output of said second address register, said second memory configured with data stored in first and second ones of said data storage locations in sequential order therein, to represent at least a second portion of a digital filter for said characteristic pattern;

said second memory having an output for said data from said first data storage location therein, to a second feedback path input to said second register, for transferring said data to said first portion of said second address register, for concatenation with said n-1 bits from said shift register to form an address for said second one of said data storage locations of said second memory; and output signal generation means coupled to said first and second feedback paths, for outputting a pattern detection alarm in response to said digital filter detecting said characteristic pattern.

7. The system of claim 6, wherein said first address register and said first addressable memory are formed in a first integrated circuit chip; and said second address register and said second addressable memory are formed in a second integrated circuit chip, coupled to said first integrated circuit chip.

8. The system of claim 6, wherein said first address register and said first addressable memory are formed in a first multi-tasking memory partition of a data processor; and p'said second address register and said second addressable memory are formed in a second multi-tasking memory partition of said data processor, coupled to said first memory partition.

9. The system of claim 6, wherein said characteristic pattern is a bit pattern in a data communications medium.

10. The system of claim 9, wherein said characteristic pattern is a bit pattern in a data communications protocol.

11. A system for adaptive, active monitoring of a serial stream of data having a characteristic pattern using a plurality of finite state machines, comprising:

a shift register, having an input coupled to said serial bit stream and at least two sequential bit stages in cascade, a first stage for buffering a first occurring binary bit and a second stage for buffering a sequentially second occurring binary bit;

a first n-bit address register having a first portion with one bit and an second portion with n-1 bits indicative of a previous address in a first finite state machine and an input to said second portion coupled to said first stage and second stage of said shift register, for receiving two sequential bits from said serial bit stream;

a memory with a first addressable memory partition having a plurality of data storage locations, said first memory partition having an n-bit address input coupled to the first and second portions for receiving from said first and second portions as an output of said first address register, said first memory partition configured with data stored in first and second ones of said data storage locations to represent at least a first portion of a digital filter for said characteristic pattern;

said first memory partition having an output for said data from said first data storage location to a feedback path input to said first register, for transferring said data to said first portion of said first address register, for concatenation with said n-1 bits from said shift register to form an address for said second one of said data storage locations of said first memory partition;

a second n-bit address register having a first portion with one bit and an second portion with n-1 bits indicative of a previous address in a first finite state machine and an input to said second portion thereof coupled to said first and second stage of said shift register, for receiving two sequential bits from said serial bit stream;

said memory having a second addressable memory partition having a plurality of data storage locations, said second memory partition having an n-bit address input coupled to the first and second portions for receiving from said first and second portions as an output of said second address register, said second memory partition configured with data stored in first and second ones of said data storage locations in sequential order, to represent at least a second portion of a digital filter for said characteristic pattern;

said second memory partition having an output for said data from said first data storage location therein, to said feedback path input to said second register, for transferring said data to said first portion of said second address register, for concatenation with said n-1 bits from said shift register to form an address for said second one of said data storage locations of said second memory partition; and output signal generation means coupled to said feedback path, for outputting a pattern detection alarm in response to said digital filter detecting said characteristic pattern.

12. The system of claim 11, wherein said first address register and said first addressable memory partition are formed in a first integrated circuit chip; and said second address register and said second addressable memory partition are formed in a second integrated circuit chip, coupled to said first integrated circuit chip.

13. The system of claim 11, wherein said first address register and said first addressable memory partition are formed in a first multi-tasking memory partition partition of a data processor; and said second address register and said second addressable memory partition are formed in a second multi-tasking memory partition partition of said data processor, coupled to said first memory partition partition.

14. The system of claim 11, wherein said characteristic pattern is a bit pattern in a data communications medium.

15. The system of claim 14, wherein said characteristic pattern is a bit pattern in a data communications protocol.

16. A method for adaptive, active monitoring of a serial stream of data having a characteristic pattern, comprising the steps of:

buffering in a shift register, having an input coupled to said serial bit stream and at least two sequential bit stages, a first stage for buffering a first occurring binary bit and a second stage in cascade with the first stage for buffering a sequentially second occurring binary bit;

receiving in a first n-bit address register having a first portion with n-1 bits and a second portion with one bit and an input to said second portion coupled to said first stage of said shift register, for receiving a bit from said serial bit stream;

digitally filtering in a first addressable memory having a plurality of data storage locations, said first memory having an n-bit address input coupled an output of said first address register, said first memory configured with data stored in first and second ones of said data storage locations in sequential order to represent at least a first portion of a digital filter for said characteristic pattern;

forming an address with a logic means having an input coupled to an output of said first memory, for converting said data output from said first data storage location into feedback data output on a feedback path to said first register, for transferring said feedback data to said first portion of said first address register, for concatenation with said bit from said first stage to form an address for said second one of said data storage locations of said first memory;

receiving in a second n-bit address register having a first portion with n-1 bits and a second portion with one bit and an input to said second portion thereof coupled to said second stage of said shift register, for receiving a bit from said serial bit stream;

digitally filtering in a second addressable memory having a plurality of data storage locations, said second memory having an n-bit address input coupled an output of said second address register, said second memory configured with data stored in first and second ones of said data storage locations therein, to represent at least a second portion of a digital filter for said characteristic pattern;

forming an address with said logic means having an input coupled to an output of said second memory, for converting said data output from said first data storage location therein, into said feedback data output on said feedback path to said second register, for transferring said feedback data to said first portion of said second address register, for concatenation with said bit from said second stage to form an address for said second one of said data storage locations of said second memory; and outputting with an output signal generation means coupled to said feedback path, for outputting a pattern detection alarm in response to said digital filter detecting said characteristic pattern.

17. A system for adaptive, active monitoring of a serial data stream having a characteristic pattern using finite state machines comprising, a) a high speed clock divider operating at a gigabit rate and providing a plurality of first time divided clock output signals which occur at every four clock cycles of the gigabit rate;

b) a plurality of shift registers, each shift register coupled to the serial data stream and receiving a different first time divided clock signal from the clock divider;

c) a plurality of first latch circuits, each latch circuit coupled to a different shift register for receiving as a first input an output from such different shift register and as a second input the different first time divided clock signal provided to such different shift register;

d) a second plurality of latch circuits, each second latch circuit coupled to a different first latch circuit for receiving as a first input an output from such different first latch circuit and as a second input a different second time divided clock signal which occurs at every twenty clock cycles of the gigabit rate; and e) a finite state machine having a cycle time and receiving as inputs an output from each second latch circuit, the outputs from the second latch circuits in sequence according to the timing of the different second time divided clock signals which match the cycle time of the finite state machine, the finite state machine providing a first output as a terminal state indicator of the serial data stream and a second output as a feedback signal to the finite state machine for concatenation with the respective outputs from the second latch circuits.

18. The system of claim 17 wherein the outputs from the second latch circuits are 2-tuple vector inputs to the finite state machine.

19. The system of claim 17 wherein the outputs of the plurality of shift registers provide bits which are permutated with respect to the order of bits in the serial data stream.

20. The system of claim 19 wherein the outputs of the plurality of first latch circuits returns the bits in the serial data stream to the original order provided as an input to the plurality of shift registers.

21. The system of claim 17 wherein the finite state machine comprises a plurality of memories for start delimiter detection in the serial data stream.

22. The system of claim 17 wherein the finite state memory comprises a plurality of memories and combination logic to determine the end delimiter in the serial data stream.

* * * * *